United States Patent
Balasubramanian et al.

(10) Patent No.: US 11,240,696 B2
(45) Date of Patent: *Feb. 1, 2022

(54) MEASURING AND VERIFYING LAYER 2 SUSTAINED DOWNLINK MAXIMUM DATA RATE DECODING PERFORMANCE

(71) Applicant: QUALCOMM Incorporated, San Diego, CA (US)

(72) Inventors: Vijay Balasubramanian, San Diego, CA (US); Sitaramanjaneyulu Kanamarlapudi, San Diego, CA (US); Pradeep Sagane Gowda, San Diego, CA (US); Yogesh Tugnawat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,947

(22) Filed: Oct. 18, 2019

(65) Prior Publication Data

US 2021/0022028 A1 Jan. 21, 2021

Related U.S. Application Data

(60) Provisional application No. 62/874,428, filed on Jul. 15, 2019, provisional application No. 62/875,769, filed on Jul. 18, 2019.

(51) Int. Cl.
  *H04W 24/10* (2009.01)
  *H04L 1/18* (2006.01)
  *H04L 12/26* (2006.01)

(52) U.S. Cl.
  CPC ........... *H04W 24/10* (2013.01); *H04L 1/1864* (2013.01); *H04L 43/0835* (2013.01); *H04L 43/50* (2013.01)

(58) Field of Classification Search
  CPC .. H04W 24/10; H04L 43/0835; H04L 1/1864; H04L 43/50
  See application file for complete search history.

(56) References Cited

U.S. PATENT DOCUMENTS 10,708,868 B2  7/2020  Osterling et al.
11,108,672 B2  8/2021  Balasubramanian et al.
(Continued)

OTHER PUBLICATIONS

3GPP TS 36.509 V15.2.0 (Dec. 2018); 3rd Generation Partnership Project; Technical Specification Group Radio Access Network; Evolved Universal Terrestrial Radio Access (E-UTRA) and Evolved Packet Core (EPC); Special conformance testing functions for User Equipment (UE) (Year: 2018).*
(Continued)

*Primary Examiner* — Hassan A Phillips
*Assistant Examiner* — Mohammed S Chowdhury
(74) *Attorney, Agent, or Firm* — The Marbury Law Group, PLLC

(57) ABSTRACT

Test entity for verifying user equipment (UE) device layer 2 sustained downlink maximum data rate decoding performance may send a non-access stratum message to the UE device that requests activation of a downlink-only test mode, sending a first Packet Data Convergence Protocol (PDCP) status request to the UE device, send downlink PDCP packets to the UE device during a measurement interval, receive a physical layer (PHY) hybrid acknowledge request (HARQ) acknowledgement (ACK) or non-acknowledgement (NACK) from the UE device and determine expected missed layer 1 packets based on the received PHY HARQ ACK/NACK, send a second PDCP status request to the UE device after the measurement interval, receive a PDCP status report from the UE device, and determine missed layer 2 packets from a First Missing Count (FMC) value or bitmap included in the received PDCP status report.

24 Claims, 17 Drawing Sheets

(56) References Cited

U.S. PATENT DOCUMENTS

| | | | |
|---|---|---|---|
| 2013/0114446 | A1 | 5/2013 | Liu et al. |
| 2014/0254393 | A1* | 9/2014 | Yi .................... H04W 72/0413 370/242 |
| 2016/0021672 | A1* | 1/2016 | Delsol .................... H04L 43/50 455/450 |
| 2016/0142951 | A1 | 5/2016 | Balasubramanian et al. |
| 2016/0352612 | A1 | 12/2016 | Daniel |
| 2017/0163331 | A1 | 6/2017 | Breiling et al. |
| 2017/0289841 | A1 | 10/2017 | Koskinen |
| 2017/0317971 | A1* | 11/2017 | Dubey .................... H04L 45/42 |
| 2018/0049050 | A1* | 2/2018 | Doshi .................. H04W 24/06 |
| 2018/0124642 | A1* | 5/2018 | Phuyal .................. H04W 24/10 |
| 2018/0139030 | A1 | 5/2018 | Kim et al. |
| 2018/0206167 | A1 | 7/2018 | Jactat |
| 2018/0227805 | A1 | 8/2018 | Jang et al. |
| 2018/0234839 | A1 | 8/2018 | Tenny et al. |
| 2018/0262950 | A1 | 9/2018 | Malkamaki et al. |
| 2018/0294827 | A1 | 10/2018 | Abdelmonem |
| 2018/0295588 | A1 | 10/2018 | Abdelmonem |
| 2019/0357196 | A1 | 11/2019 | Majmundar et al. |
| 2020/0028575 | A1 | 1/2020 | Buer et al. |
| 2020/0091608 | A1 | 3/2020 | Alpman et al. |
| 2020/0113008 | A1 | 4/2020 | Luo et al. |
| 2020/0235869 | A1 | 7/2020 | Pradas et al. |
| 2020/0280377 | A1* | 9/2020 | Haustein ................ H04B 17/20 |
| 2021/0021504 | A1 | 1/2021 | Balasubramanian et al. |

OTHER PUBLICATIONS

3GPP TS 34.109 V15.0.0 (Jul. 2018); 3rd Generation Partnership Project; Technical Specification Group Radio Access Network; Terminal logical test interface; Special conformance testing functions for User Equipment (UE) (Year: 2018).*

3GPP TS 36.323 V15.4.0 (Jun. 2019); 3rd Generation Partnership Project; Technical Specification Group Radio Access Network; Evolved Universal Terrestrial Radio Access (E-UTRA); Packet Data Convergence Protocol (PDCP) specification. (Year: 2019).*

Vijay Balasubramanian et al., copending U.S. Appl. No. 16/656,964, filed Oct. 18, 2019, "Measuring and Verifying Layer 2 Sustained Downlink Maximum Data Rate Decoding Performance".

Balasubramanian V., et al., Copending U.S. Appl. No. 16/656,947, filed Oct. 18, 2019, "Measuring and Verifying Layer 2 Sustained Downlink Maximum Data Rate Decoding Performance", 87 Pages.

"3rd Generation Partnership Project; Technical Specification Group Radio Access Network; 5GS; Special Conformance Testing Functions for User Equipment (UE) (Release 15)", 3GPP Standard, Technical Specification, 3GPP TS 38.509, 3rd Generation Partnership Project (3GPP), Mobile Competence Centre, 650, Route Des Lucioles, F-06921, Sophia-Antipolis Cedex, France, vol. Ran WG5, No. V15.4.0, Jun. 26, 2019 (Jun. 26, 2019), pp. 1-31, XP051754385, [retrieved on Jun. 26, 2019] p. 10-p. 11.

International Search Report and Written Opinion—PCT/US2020/034766—ISA/EPO—dated Sep. 10, 2020. 13 pages.

* cited by examiner

MEASURING AND VERIFYING LAYER 2 SUSTAINED DOWNLINK MAXIMUM DATA RATE DECODING PERFORMANCE

RELATED APPLICATIONS

This application claims the benefit of priority to U.S. Provisional Application No. 62/874,428, entitled "Measuring and Verifying Layer 2 Sustained Downlink Maximum Data Rate Decoding Performance" filed Jul. 15, 2019, and U.S. Provisional Application No. 62/875,769, entitled "Measuring and Verifying Layer 2 Sustained Downlink Maximum Data Rate Decoding Performance" filed Jul. 18, 2019, the entire contents of both of which are hereby incorporated by reference.

BACKGROUND

Long Term Evolution (LTE), 5G new radio (NR), and other recently developed communication technologies allow wireless devices to communicate information at data rates (e.g., in tell is of Gigabits per second, etc.) that are orders of magnitude greater than what was available just a few years ago. Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications. As a result, billions of mobile and resource constrained computing devices (e.g., smartphones, watches, smart appliances, autonomous vehicles, etc.) now use Internet Protocol (IP) and cellular communication networks to communicate critical and mundane information. In order to be qualified to connect to new communication networks, device manufactures must prove that the performance of wireless communication devices satisfies the technology standards. Such proof is provided by testing devices using testing equipment (referred to herein as a test entity) executing testing procedures that are able to measure various performance characteristics specified in the technology standards.

SUMMARY

Various aspects of the disclosure include methods that are performed by a processor in a test entity for verifying layer 2 (data link layer) sustained downlink maximum data rate decoding performance of user equipment (UE) wireless communication devices. Various aspects may include sending a non-access stratum (NAS) signaling message that requests activation of a downlink-only test mode to the user equipment device, sending a first Packet Data Convergence Protocol (PDCP) status request to the user equipment device, sending downlink PDCP packets to the user equipment device during a measurement interval after sending the first PDCP status request to the user equipment device, receiving a physical layer (PHY) hybrid acknowledge request (HARQ) acknowledgement (ACK) or non-acknowledgement (NACK) from the user equipment device and determining expected missed layer 1 packets based on information included in the received PHY HARQ ACK/NACK, sending a second PDCP status request to the user equipment device after the measurement interval, receiving a PDCP status report from the user equipment device in response to the second PDCP status request, and determining missed layer 2 packets from a First Missing Count (FMC) value or bitmap included in the received PDCP status report.

Some aspects may include forgoing configuring a T-reordering timer associated with the downlink-only test mode (and when T-reordering is not configured by the test entity, the UE may internally set the T-reordering to value infinity). In some aspects, sending the NAS signaling message that requests activation of the downlink-only test mode to the user equipment device may include sending a NAS signaling message that requests activation of a new test mode that does not loopback data to the test entity in an uplink. In some aspects, sending the NAS signaling message that requests activation of the downlink-only test mode to the user equipment device may include sending a NAS signaling message that requests activation of a modified test mode that does not loopback data to the test entity in an uplink.

In some aspects, sending the NAS signaling message that requests activation of the modified test mode that does not loopback data to the test entity in the uplink may include sending a NAS signaling message that requests activation of a modified User Equipment Test Loop Function Test Loop Mode A (or other test mode, such as Test Mode B, etc.) that does not loopback data to the test entity in an uplink. Some aspects may include modifying an existing test mode to not loopback data to the test entity in an uplink. In some aspects, modifying the existing test mode to not loopback data to the test entity in an uplink may include setting payload bits in the NAS signaling message.

Some aspects may include setting DL MAX HARQ transmission=1 and RLC Max Retransmission=1. Some aspects may include, before a test begins, injecting a bad PDCP packet at predetermined interval, determining whether the user equipment device accurately reports those bad PDCP packets as missed packets in the PDCP status report, and using a result of determining whether the user equipment device accurately reports those bad PDCP packets as missed packets in the PDCP status report as a baseline for conducting the test.

Further aspects may include a method performed by a processor of a user equipment (UE) device for verifying layer 2 sustained downlink maximum data rate decoding performance, which may include receiving a non-access stratum (NAS) signaling message that requests activation of a downlink-only test mode from a test entity, receiving downlink Packet Data Convergence Protocol (PDCP) packets from the test entity during a measurement interval, decoding the received downlink PDCP packets, storing decode status information in a memory of the user equipment device, and dropping the received downlink PDCP packets in response to storing the decode status information in the memory of the user equipment device.

In some aspects, receiving the NAS signaling message that requests activation of the downlink-only test mode may include receiving a NAS signaling message that requests activation of a new test mode that does not loopback data to the test entity in an uplink. In some aspects, receiving the NAS signaling message that requests activation of the downlink-only test mode may include receiving a NAS signaling message that requests activation of a modified test mode that does not loopback data to the test entity in an uplink. In some aspects, receiving the NAS signaling message that requests activation of the modified test mode that does not loopback data to the test entity in an uplink may include receiving a NAS signaling message that requests activation of a modified UE Test Loop Function UE Test Loop Mode A.

In some aspects, activating the downlink-only test mode may include suppressing user plane data in the user equipment device. Some aspects may include transmitting a physical layer (PHY) hybrid acknowledge request (HARQ) acknowledgement (ACK) or non-acknowledgement (NACK) to the test entity via a Physical Uplink Shared Channel (PUSCH) or a Physical Uplink Control Channel (PUCCH) in response to decoding the received downlink PDCP packets. Some aspects may include receiving a PDCP status request after activating the downlink-only test mode and prior to receiving the downlink PDCP packets from the test entity during the measurement interval, and flushing the memory of the user equipment device of received downlink PDCP packets and the decode status information in response to receiving the PDCP status request after activating the downlink-only test mode and prior to receiving the downlink PDCP packets from the test entity during the measurement interval.

Some aspects may include receiving a PDCP status request from the test entity after the measurement interval, using the decode status information stored in the memory to determine a First Missing Count (FMC) value and identify missing packet sequence numbers in response to receiving the PDCP status request from the test entity after the measurement interval, generating a PDCP status report that includes the FMC value and a bitmap containing the missing packet sequence numbers, and sending the generated PDCP status report to the test entity. In some aspects, receiving the PDCP status request from the test entity after the measurement interval may include receiving a PDCP reestablishment or PDCP recovery Request from the test entity. In some aspects, using the decode status information stored in the memory to determine the FMC value and identify the missing packet sequence numbers may include performing a PDCP reestablishment procedure or a PDCP recovery procedure.

Further aspects may include a UE device (e.g., mobile or wireless device, etc.) having a processor configured to perform one or more UE device operations of the methods summarized above. Further aspects may include a test entity (e.g., a system simulator, base station, etc.) having a processor configured to perform one or more test entity operations of any of the methods summarized above. Further aspects may include a non-transitory processor-readable storage medium having stored thereon processor-executable instructions configured to cause a processor of a test entity or UE device to perform operations of any of the methods summarized above. Further aspects may include a test entity or a UE device having means for performing functions of any of the methods summarized above. Further aspects may include a system on chip for use in a test entity and/or UE device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
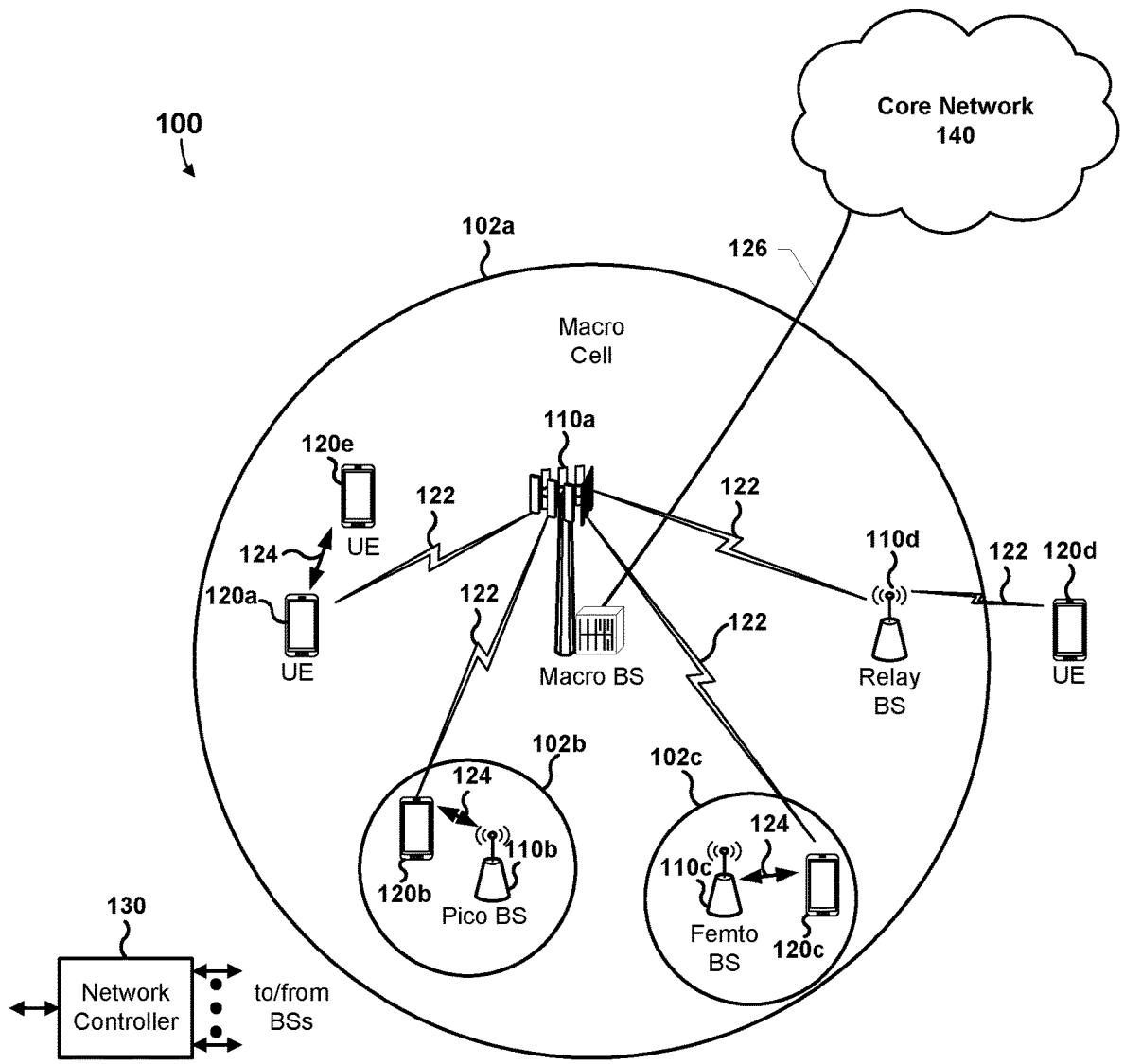
FIG. 1 is a system block diagram conceptually illustrating an example communications system including a small cell and a problem that can develop in such systems.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The terms "user equipment" and its acronym "UE" may be used interchangeably herein to refer to any one or all of wireless router devices, wireless appliances, cellular telephones, smartphones, portable computing devices, personal or mobile multi-media players, laptop computers, tablet computers, smartbooks, palmtop computers, wireless electronic mail receivers, multimedia Internet-enabled cellular telephones, wireless gaming controllers, wireless-network enabled Internet of Things (IoT) devices including large and small machinery and appliances for home or enterprise use, wireless communication elements within autonomous and semiautonomous vehicles, UE devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single UE device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, intellectual property core, graphics processor unit (GPU) core, etc.) configured to read and execute program instructions. An SOC may include multiple multicore processors, and each processor in an SOC may be referred to as a core. The term "multiprocessor" may be used herein to refer to a system or device that includes two or more processing units configured to read and execute program instructions.

The 3rd Generation Partnership Project (3GPP) Radio Access Network (RAN) Telecommunication and Internet converged Services and Protocols for Advanced Networking (TISPAN) Working Group 4 (herein "3GPP RAN4") is responsible for establishing standards and specification for the radio frequency (RF) aspects of modern cellular or telecommunication network. 3GPP RAN4 performs simulations of diverse RF system scenarios and derives the minimum requirements for transmission and reception parameters, and for channel demodulation. Once these requirements are set, the 3GPP RAN5 group defines the test procedures that will be used to verify them (for the base stations).

3GPP RAN5 defines a "UE test loop function" to provide access to isolated functions of the UE via the radio interface for conformance testing, without introducing new physical interfaces. The UE test loop function is activated by transmitting an appropriate test control (TC) message to the UE. The UE Test Loop Function can be operated in different UE loopback modes, namely UE Loopback Modes A through I.

UE Test Loop Function UE Test Loop Mode (e.g., Mode A, B, etc.) provides loopback of PDCP Service Data Units (SDUs) for bi-directional data radio bearers while UE is operating in 5G NR. The downlink PDCP SDUs received by the UE on each bi-directional data radio bearer are returned on the same radio bearer regardless of the PDCP SDU contents.

3GPP RAN5 sets forth a performance specification that details downlink layer 1 and layer 2 decoding performance requirements for user equipment devices. Layers 1 and 2 of the Open Systems Interconnection model (OSI model) define the air interface of modern cellular or telecommunication networks. Layer 1 is the physical layer and layer 2 is the data link layer. The data link layer (layer 2) is divided into multiple protocol layers. In UMTS, LTE, and 5G NR, layer 2 protocol layers include the packet data convergence protocol (PDCP) layer, the radio link control (RLC) protocol layer, and the medium access control (MAC) protocol layer. The base station has the control over the air interface, and schedules the downlink access as well as the uplink access of all user equipment (UE) devices.

In order to evaluate user equipment device's layer 2 maximum downlink data rate capabilities in a sustained manner, the user equipment device's layer 2 (up-to the PDCP layer) decoding performance has to be verified. Conventional solutions verify the layer 2 requirement via Loopback Mode A, initiated by a System Simulator (SS).

For example, a conventional solution verifying the UE device's layer 2 decoding performance may include the UE activating its test mode to suppress user plane data, and activating UE Test Loop Function UE Test Loop Mode A after receiving a Non-Access Stratum (NAS) signaling with CLOSE UE TEST LOOP loop back truncated version of the downlink data into uplink. In response, the System Simulator (SS) sends downlink data (via PDCP) during a measurement interval. UE receives the data, decodes it and sends a physical layer (PHY) acknowledgement (ACK) or non-acknowledgement (NACK) to the network via the Physical Uplink Shared Channel (PUSCH) or the Physical Uplink Control Channel (PUCCH). In addition, to comply with the requirements of UE test loop mode A, the UE truncates each of the packets, and loops them back into uplink PDCP. That is, to comply with the requirements of UE test loop mode A, the UE has to do additional processing (i.e., truncating and looping the packets back into uplink PDCP) even though uplink data path verification is not required for the test. Further, if any of the downlink packets are missed, the UE is required store all subsequent packets in its buffers until the missed packet is retrieved and decoded correctly.

This conventional approach for verifying the UE's layer 2 decoding performance via "Loopback mode A" adds complexity to test/verification procedure, and places an enormous burden on UE. For example, in LTE with 2 Gbps downlink data rate, the number of PDCP SDU packets that the UE may be required to process during the test duration could be as high as 0.5 million (150 SDU*3000 Transmission Time Interval (TTI)) packets. The burden on UE for processing downlink packets and then looping back into uplink could be even greater for 5G UE devices. That is, because 5G-NR may include downlink throughput rates that exceed 20 Gbps (i.e., over 10 times greater downlink throughput than LTE), the number of PDCP packets sent from the System Simulator (SS) to the UE during the measurement interval exceed 5 million. Processing 5 million or more PDCP downlink packets and looping them back into uplink could consume a significant amount of the processing, memory, battery/energy, and bandwidth resources of the UE, SS or base station, and otherwise have a significant negative impact on the performance, functionality, or responsiveness of the UE device or network.

Various embodiments include components configured to verify the layer 2 (UPTO PDCP) sustained downlink maximum data rate decoding performance without consuming an excessive amount of the processing, memory, battery/energy, and bandwidth resources of the UE or base station, or otherwise having a significant negative impact on the performance, functionality, or responsiveness of the UE device or network.

In the embodiments, a test entity (e.g., System Simulator, etc.) and/or UE may be configured to support a test mode that is downlink only (e.g., new UE Test Loop Mode X, modified existing test mode that does not include loopback, PDCP Downlink only data operation mode, etc.). The test entity could be a new UE test loop entity, or could be an existing test entity (e.g., System Simulator, etc.) that is configured to support a modified UE test loop functionality (e.g., to ensure that the UE discards downlink PDCP SDUs without looping back on the uplink). That is, similar to Loopback Mode A, this new or modified loop mode allows for the downlink data to originate and terminate in the PDCP layer. However, unlike Loopback Mode A, the UE does not loop back the received data into the uplink. Rather, once this test entity or loop mode is activated and closed, the downlink data received from the test entity is processed, recorded as received, and discarded by the UE device.

Because the data is discarded, the test entity (e.g., System Simulator, etc.) does not need to configure T-reordering and the UE is not required store all subsequent packets in its buffers until the missed packet is retrieved and decoded correctly. The test entity may request PDCP status report from the UE via PDCP reestablishment or PDCP recovery procedure, which provide a First Missing Count (FMC) and a bitmap containing all the missing packet sequence numbers. The test entity (e.g., SS, etc.) may determine the Layer 2 decode success rate based on the FMC and bitmap.

In some embodiments, the test entity may be configured to send a non-access stratum (NAS) signaling message that requests activation of a loop mode that does not require test entity to configure T-reordering timer or ensures that the UE discards downlink PDCP SDU without looping back on the uplink. The test entity may send a first packet data convergence protocol status request to UE device, and commence sending downlink PDCP packets to UE device during measurement interval. In response, the test entity may receive PHY HARQ ACKs/NACKs from UE device and determine expected missed layer 1 packets based on information included in received PHY HARQ ACKs/NACKs. The test entity may send a second PDCP status request to UE device in response to determining that measurement interval has lapsed, receive PDCP status report from UE device in response to sending second PDCP status request to UE device, and determine or compute missed layer 2 packets from a First Missing Count (FMC) value or bitmap included in the received PDCP status report. In some embodiments, the test entity may cross verify missed layer 2 packets by determining or computing the missed layer 2 packets from a First Missing Count (FMC) value or bitmap included in the received PDCP status report. In some embodiments, the test entity may cross verify missed layer 2 packets by comparing expected missed layer 1 packets to the FMC values or bitmaps included in received PDCP status report. In some embodiments, the cross verification of the missed layer 2 packets may include the test entity (e.g., SS) configuring or setting DL MAX HARQ transmission=1 and RLC Max Retransmission=1. Alternatively, before the actual test begins, the test entity may inject bad PDCP packets at predetermined interval to check if the UE accurately reports those bad PDCP packets as missed packets in the PDCP status report, which may allow the test entity to establish a baseline for conducting the actual test.

In some embodiments, the test entity may be configured to inject known bad packets at predetermined intervals in the downlink, and determine whether the UE accurately responds back with the missed PDCP packet information in the PDCP status report.

Thus, to verify the accuracy of the missing packet information in the PDCP status report from UE, the test entity may send requests for PDCP status reports both before and after the measurement duration. Sending a request for a status report before the measurement duration flushes out any missing packet information before actual test begins.

In addition, the test entity may use Layer 1 information (e.g., PHY HARQ ACK/NACK) to determine the expected missed PDCP packets and/or corroborate with the number of missing packet count provided in the PDCP status report. To accomplish this, in some embodiments, the test entity may set DL MAX HARQ transmission=1 and RLC Max Retransmission=1. Alternatively, before the actual test begins, the test entity may inject bad PDCP packets at predetermined interval to check if the UE accurately reports those bad PDCP packets as missed packets in the PDCP status report. This may allow the test entity to establish a baseline for conducting the actual test.

In some embodiments, a processor of a user equipment (UE) device may be configured to verify layer 2 sustained downlink maximum data rate decoding performance by activating a downlink-only test mode (e.g., in response to receiving a new non-access stratum (NAS) command) that does not require that the UE loopback data in an uplink, or activating a test mode that does not require that a test entity have T-reordering parameter in "PDCP-Config" information element (IE) when configuring the PDCP parameter for signaling and data radio bearers.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices 120a-120e. The communications system 100 may also include a number of base stations 110 (illustrated as the BS 110a, the BS 110b, the BS 110c, and the BS 110d) and other network entities. A base station is an entity that communicates with mobile device (mobile devices), and also may be referred to as an Node B, a Node B, an LTE evolved node B (eNB), an Access point (AP), a radio head, a transmit receive point (TRP), a new radio base station (NR BS), a 5G Node B (NB), gNB, or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110 may provide communication coverage for a macro cell, a pico cell, a femto cell, another type of cell, or a combination thereof. A macro cell may cover a relatively large geographic area (for example, several kilometers in radius) and may allow unrestricted Access by mobile devices with service subscription. A pico cell may cover a relatively small geographic area and may allow unrestricted Access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a may communicate with the core network 140 over a wired or wireless communication link 126. The UE devices 120a-e may communicate with base stations 110a-d over wireless communication links 122.

The wired communication link 126 may use a variety of wired networks (e.g., Ethernet, TV cable, telephony, fiber optic and other forms of Physical network connections) that may use one or more wired communication protocols, such as Ethernet, Point-To-Point Protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a mobile device or a base station). A relay station also may be a mobile device that can relay transmissions for other mobile devices. In the example illustrated in FIG. 1, a relay station 110d may communicate with macro the base station 110a and the mobile device 120d in order to facilitate communication between the base station 110a and the mobile device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. Network controller 130 may communicate with the base stations via a backhaul. The base stations also may communicate with one another, for example, directly or indirectly via a wireless or wireline backhaul.

The mobile devices 120a-120e may be dispersed throughout communications system 100, and each mobile device may be stationary or mobile. A mobile device 120a-120e also may be referred to as an access terminal, a terminal, a mobile station, a subscriber unit, a station, etc.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, CDMA, WCDMA, WiMAX, TDMA, and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal fast file transfer (FFT) size may be equal to 128, 256, 812, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., downlink or uplink) for data transmission and the link direction for each subframe may be dynamically switched. Each subframe may include downlink/uplink data as well as downlink/uplink control data. Beamforming may be supported and beam direction may be dynamically configured. Multiple input multiple output (MIMO) transmissions with precoding may also be supported. MIMO configurations in the downlink may support up to 8 transmit antennas with multi-layer downlink transmissions up to 8 streams and up to 2 streams per UE device. Multi-layer transmissions with up to 2 streams per UE device may be supported. Aggregation of multiple cells may be supported with up to 8 serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. Mobile devices 120a-120e may be included inside a housing that houses device components, such as processor components, memory components, similar components, or a combination thereof.

In general, any number of communications systems may be deployed in a given geographic area. Each communications system may support a particular radio access technology (RAT) and may operate on one or more frequencies. A RAT also may be referred to as a radio technology, an air interface, etc. A frequency also may be referred to as a carrier, a frequency Channel, etc. Each frequency may support a single RAT in a given geographic area in order to avoid interference between communications systems of different RATs. In some cases, NR or 5G RAT networks may be deployed.

Figure 2:
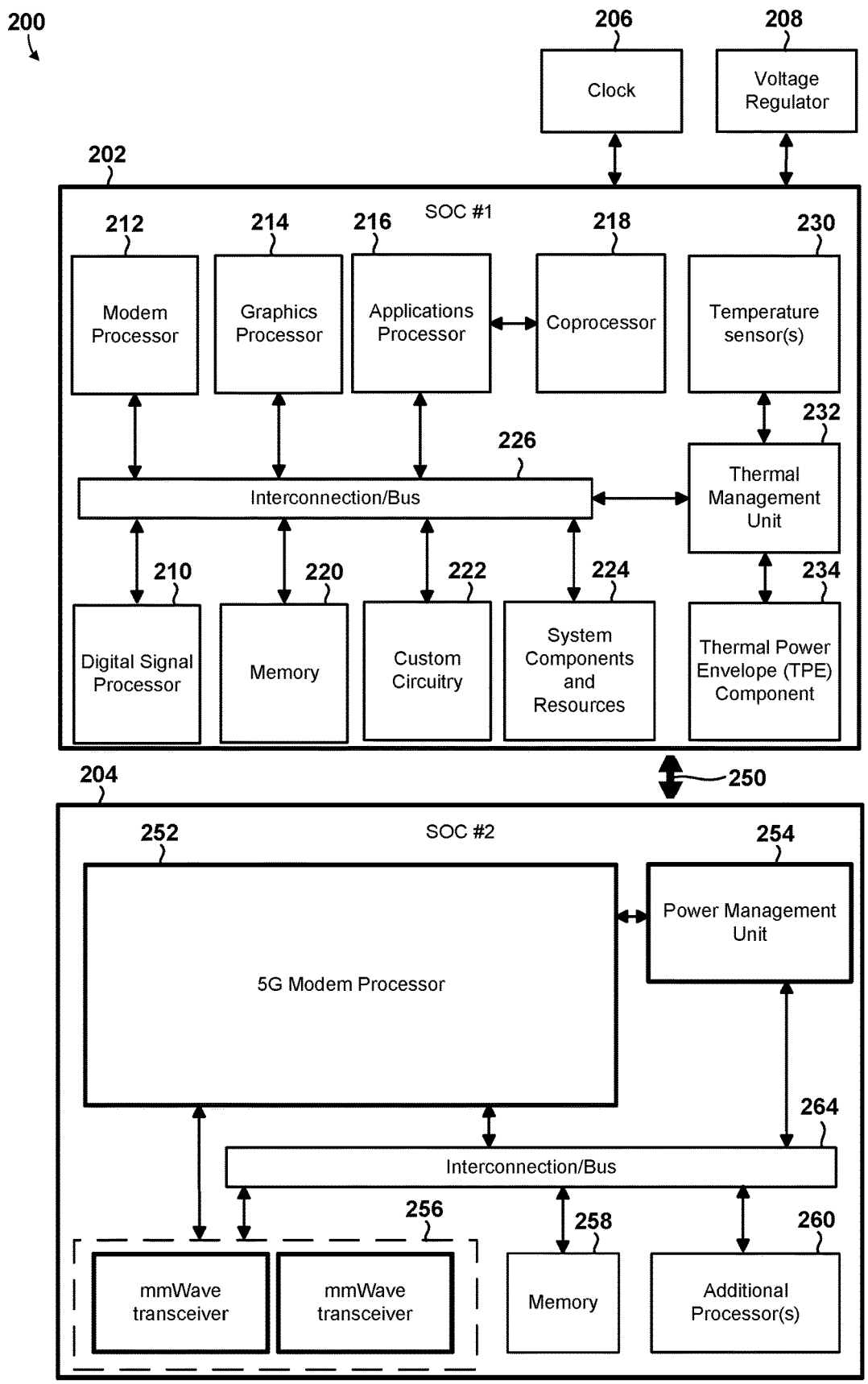
FIG. 2 is a component block diagram illustrating a computing system that may be configured to implement management of cell selection in accordance with various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in UE devices implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the UE device that carries out the instructions of software application programs by performing the arithmetic, logical, Control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, Access ports, timers, and other similar components used to support the processors and software clients running on a UE device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be Shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
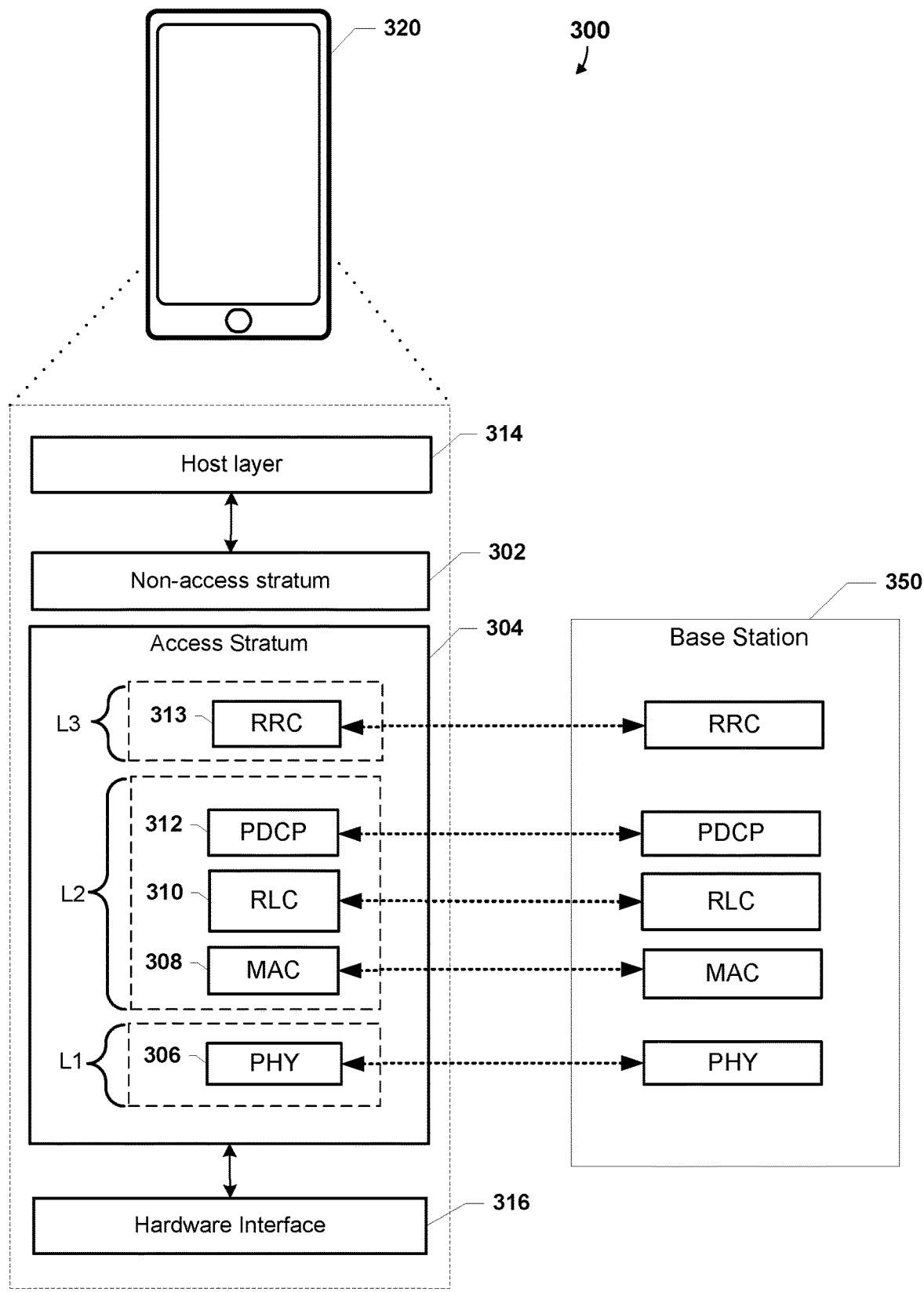
FIG. 3 is a diagram illustrating an example of a software architecture including a radio protocol stack for the user and Control planes in wireless communications in accordance with various embodiments.

FIG. 3 illustrates an example of a software architecture 300 including a radio protocol stack for the user and control planes in wireless communications between a base station 350 (e.g., the base station 110a-110d) and a UE device 320 (e.g., the UE device 120a-120e). With reference to FIGS. 1-3, the UE device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) UE device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a non-access stratum 302 and an access stratum 304. The non-access stratum 302 may include functions and protocols to support packet filtering, security management, mobility control, session management, and traffic and signaling between a processor or SIM(s) of the UE device (e.g., SIM(s) 204) and its core network. The access stratum 304 may include functions and protocols that support communication between a processor or SIM(s) (e.g., SIM(s) 204) and entities of supported access networks (e.g., a base station). In particular, the access stratum 304 may include at least three layers (Layer 1, Layer 2, and Layer 3), each of which may contain various sub-layers.

In the user and control planes, layer 1 (L1) of the access stratum 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, layer 2 (L2) of the access stratum 304 may be responsible for the link between the UE device 320 and the base station 350 over the physical layer 306. In the various embodiments, layer 2 may include a media access control (MAC) sublayer 308, a radio link control (RLC) sublayer 310, and a packet data convergence protocol (PDCP) sublayer 312, each of which form logical connections terminating at the base station 350.

In the control plane, layer 3 (L3) of the access stratum 304 may include a radio resource control (RRC) sublayer 3. While not shown, the software architecture 300 may include additional layer 3 sublayers, as well as various upper layers above layer 3. In various embodiments, the RRC sublayer 313 may provide functions including broadcasting system information, paging, and establishing and releasing an RRC signaling connection between the UE device 320 and the base station 350.

In various embodiments, the PDCP sublayer 312 may provide uplink (UL) functions including multiplexing between different radio bearers and logical channels, sequence number addition, handover data handling, integrity protection, ciphering, and header compression. In the downlink (DL), the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and HARQ operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, Server, etc.). In some embodiments, the software architecture 300 may further include in the access stratum 304 a hardware interface 316 between the physical layer 306 and the communication hardware (e.g., one or more RF transceivers).

Figure 4:
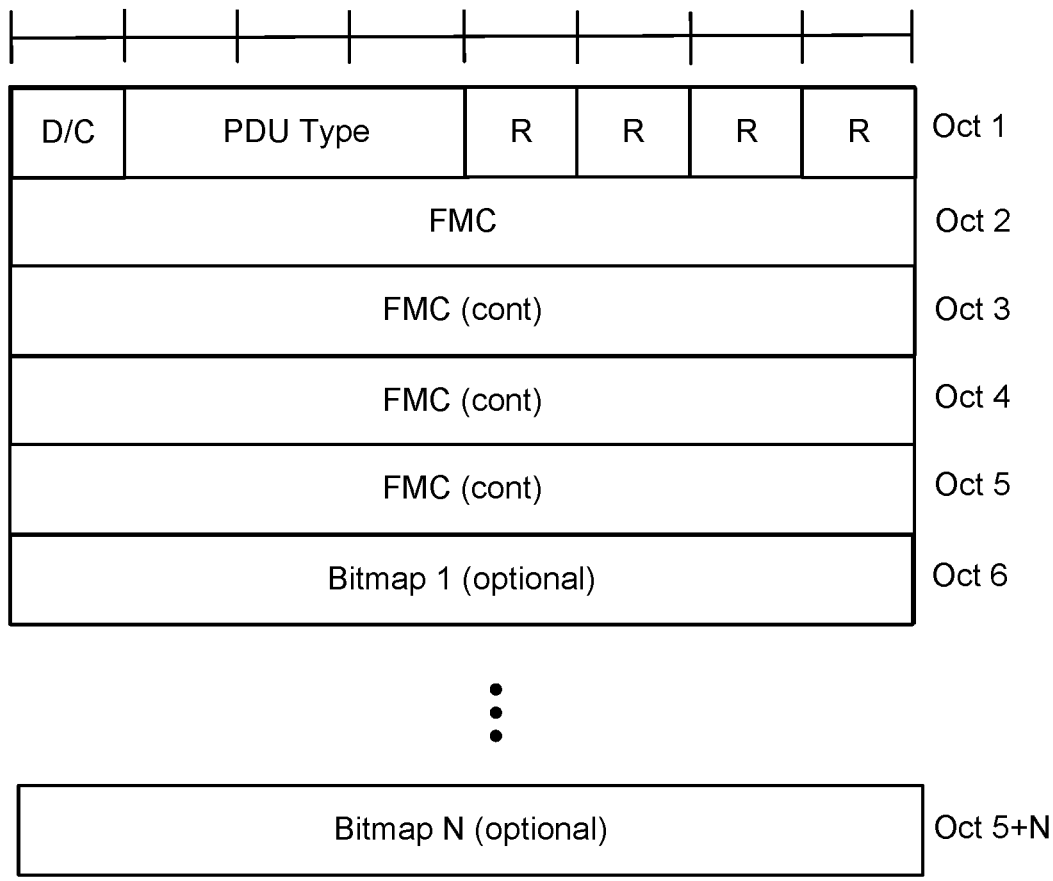
FIGS. 4 and 5 are block diagrams illustrating a PDCP control packet data unit that could be used to generate and send PDCP status reports in accordance with some embodiments.

FIG. 4 illustrates the format of a PDCP control packet data unit (PDU) 400 that could be used to generate and send PDCP status reports in some embodiments. The PDCP control PDU may be used to convey a PDCP status report indicating which PDCP service data units (SDUs) are missing and which are not following a PDCP re-establishment, header compression control information (e.g. interspersed Robust Header Compression feedback), an LTE-WLAN Aggregation (LWA) status report, etc. In the example illustrated in FIG. 4, the PDCP control PDU 400 includes a data/control (D/C) bit, three PDU type bits, and four reserved (R) bits in a first octet (Oct 1). The PDCP control PDU 400 includes first missing count (FMC) values in the second to fifth octets (i.e., Oct 2-5). The PDCP control PDU 400 may also optionally includes bitmaps (e.g., Bitmap 1-N) in the remaining octets (i.e., Oct 6–Oct 5+N).

Figure 5:
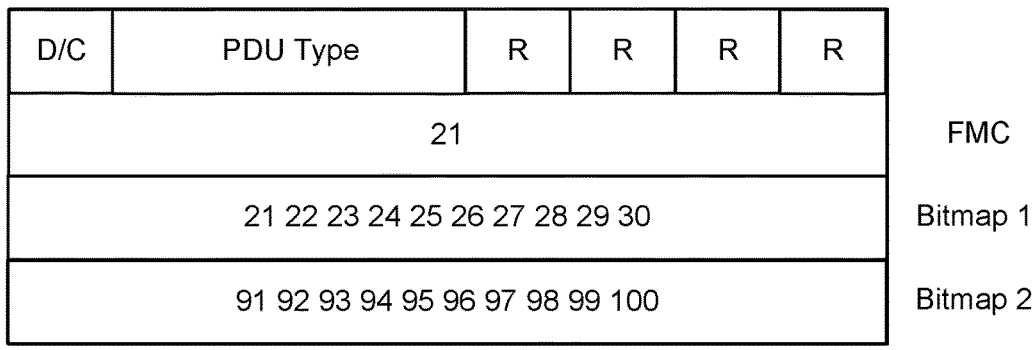
Figure 5:
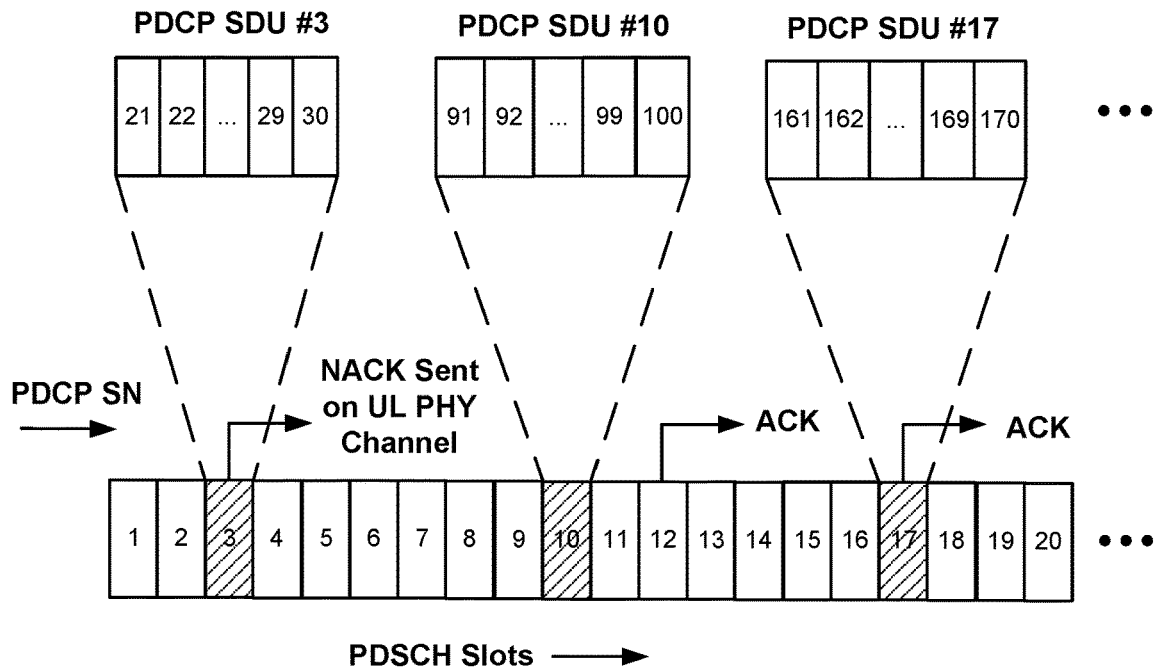

FIG. 5 illustrates a PDCP control PDU 500 that could be used to send PDCP status reports in accordance with various embodiments. In the example illustrated in FIG. 5, the PDCP control PDU 500 includes an FMC value of 21 (in binary), a first bitmap that includes values 21-30 (in binary), and a second bitmap that include values 91-1000.

With reference to FIG. 5, the test entity sends PDSCH data for 20 slots during the test. In order to fill the Tbsize for each slot, the test entity may generate sufficient PDCP SDU (e.g., 10 PDCP SDU per slot). In the example illustrated in FIG. 5, the UE fails to decode PDSCH on slot #3 and slot #10, and fails to decode the corresponding PDCP SDUs. The test entity receives PHY ACK/NACK for PDSCH data sent by the UE on PUCCH/PUSCH, and queries the PDCP status report to obtain the missed PDCP packet information. The test entity uses the information included in the PDCP control PDU 500 to generate a sample L1 and L2 decode performance calculation based on the sample PDCP status report. For example, if the total number of slots is 20, the number of ACKs is 18, and the number of NACKs is 2 (or 20–18), the processing device may compute the layer 1 PHY Block Error Rate (BLER) performance as 2/20=10%. If the total number of the PDCP SDU generated by the test entity is 20×10=200, the total PDCP SDU reported as missing in the PDCP status report is 20, the processing device may compute the layer 2 decode performance or PDCP SDU success rate as (200−20)/200=90%.

The test entity may cross verify the accuracy of PDCP status report by configuring the PHY HARQ Transmission as 1 and RLC Max Transmission as 1 so that any NACK on the PHY layer will result in corresponding missed PDCP SDU. Since UE may not be able to recover the PDCP SDU either via PHY layer or RLC layer, the PHY BLER % directly translates to PDCP failure rate %.

Alternatively or in addition, the test entity may cross verify the accuracy of PDCP status report by sending a corrupted PDCP SDU on the downlink at predetermined intervals before the measurement interval, and querying the UE's PDCP status reports to confirm that the UE correctly reported the corrupted PDCP SDU as missed packets in the FMC and Bitmap field.

Thus, in the example illustrated in FIG. 5, the test entity evaluates the UE device's layer 2 maximum downlink data rate capabilities in a sustained manner, computes the Layer 1 BLER as (num of NACK)/(num of ACK+NACK)=10%, computes the PDCP SDU success rate as 90%, and/or cross verifies the accuracy of PDCP status report. The test entity may use this information to verify the UE device's layer 2 (up-to the PDCP layer) decoding performance complies with the minimum requirements set forth in the 3GPP RAN5 performance specification.

Figure 6:
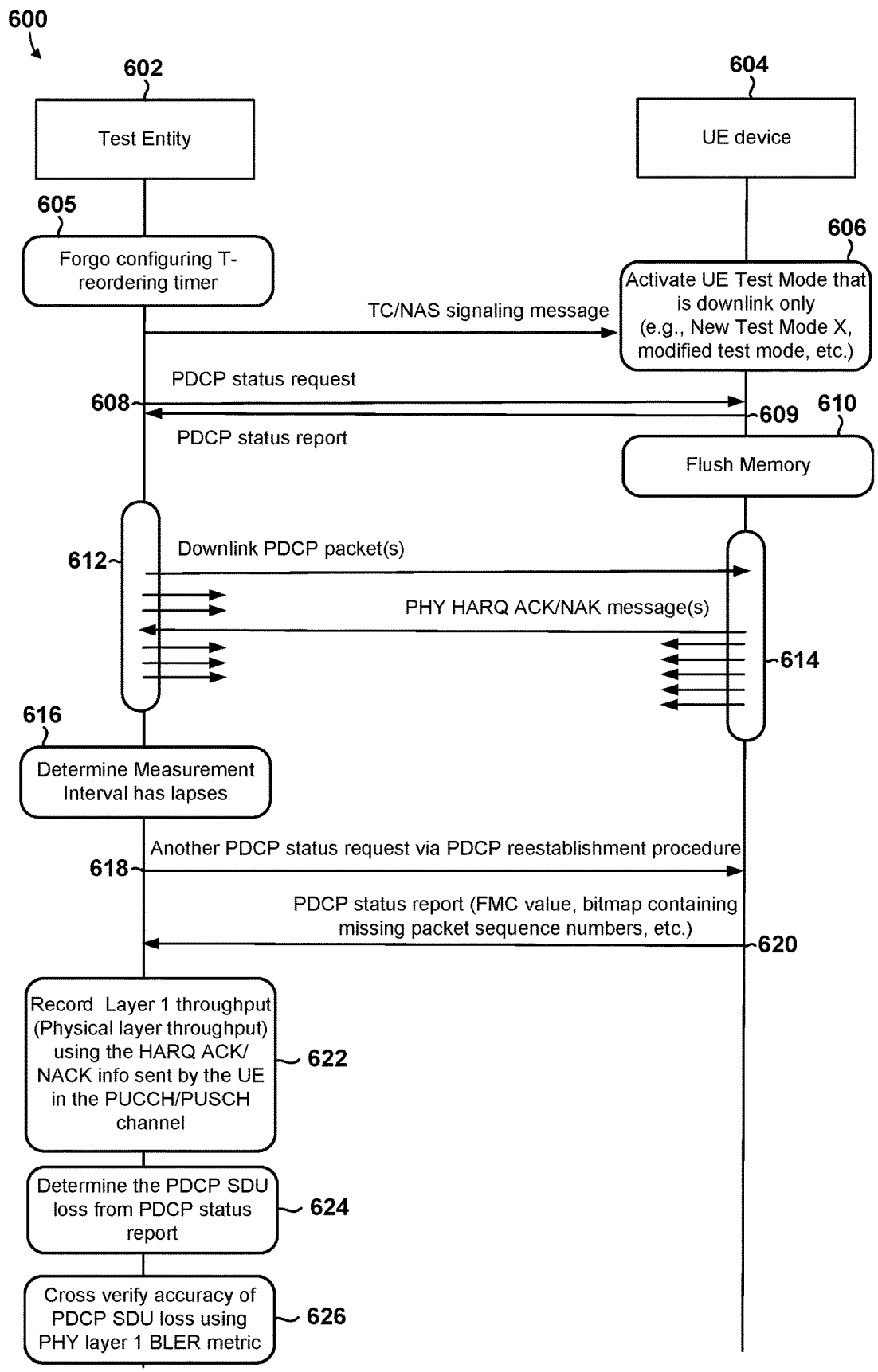
FIG. 6 is a message flow diagram illustrating components, operations, and communications in a system that could be configured to verify layer 2 sustained downlink maximum data rate decoding performance in accordance with some embodiment.

FIG. 6 illustrates components, operations, and communications in a system 600 configured to verify layer 2 sustained downlink maximum data rate decoding performance in accordance with an embodiment. In the example illustrated in FIG. 6, the system 600 includes a test entity 602 and a UE device 604.

It should be understood that the system 600 may perform the operations in blocks 605-626 multiple times and in any order. For example, the test entity may perform the operations in block 605 before, during, or after the operations in block 608.

With reference to FIG. 6, in block 605, the test entity may forgo configuring a T-reordering timer associated with a test mode and send a TC message or a NAS signaling message to the test entity 602.

In operation block 606, the UE device 604 may activate a UE test mode that is downlink only. The activated test mode may be a new test mode (e.g., New Test Mode X) that does not loopback data to the test entity in an uplink or does not require that the test entity 602 configure the T-reordering timer. The activated test mode may also be a modified version of an existing test mode (e.g., a modified Test Mode A, B, etc.) that does not loopback data to the test entity in an uplink or does not require that the test entity 602 configure the T-reordering timer. In some embodiments, this may be accomplished by suppressing user plane data in the UE device.

In operation 608, the test entity 602 may generate and send a first PDCP status request to the UE device 604 in response to receiving the TC/NAS signaling message from the UE device 604.

In operation 609, the test entity 602 may receive a PDCP status report from the UE device 604 in response to the first PDCP status request.

In operation block 610, the UE device 604 may flush its UE device memories of previously received downlink PDCP packets and/or previously stored decode status information.

In operation block 612, the test entity 602 may start a measurement interval, commence sending downlink PDCP packets to the UE device 604 during the measurement interval, commence receiving PHY HARQ ACKs/NACKs from the UE device 604, and determining expected missed layer 1 packets based on information included in the received PHY HARQ ACKs/NACKs.

In operation block 614, the UE device 604 may receive downlink PDCP packets from the test entity 602 during the measurement interval, decode the received downlink PDCP packets, transmit PHY HARQ ACKs/NACKs for reception by the test entity 602, storing decode status information in a memory of the UE device, and drop the received/decoded downlink PDCP packets.

In operation block 616, the test entity 602 may determine that the measurement interval has lapsed and cease sending downlink PDCP packets to the UE device 604. In operation 618, the test entity 602 send a second PDCP status request to the UE device in response to determining that the measurement interval has lapsed.

In operation 620, the UE device 604 may receive the second PDCP status request, perform a PDCP reestablishment procedure or a PDCP recovery procedure that uses the decode status information stored in memory to determine the FMC value and identify missing packet sequence numbers, generate a PDCP status report that includes the FMC value and a bitmap containing missing packet sequence numbers, and send the generated PDCP status report to the test entity 602.

In operation block 622, the test entity 602 may record Layer 1 throughput (Physical layer throughput) using the HARQ ACK/NACK info sent by the UE in the PUCCH/PUSCH channel. In operation block 624, the test entity 602 may compute the PDCP SDU loss from e the PDCP status report received from the UE device 604. In operation block 626, the test entity may cross verify accuracy of PDCP SDU loss using PHY layer 1 BLER metric. For example, the test entity may determine (e.g., compute) missed layer 2 packets from a First Missing Count (FMC) value or bitmap included in the received PDCP status report and/or cross verify missed layer 2 packets by comparing the expected missed layer 1 packets (determined in block 612) to the FMC value or bitmap containing missing packet sequence numbers (sent by the UE in block 620). In some embodiments, the cross verification of the missed layer 2 packets may include the test entity (e.g., SS) configuring or setting DL MAX HARQ transmission=1 and RLC Max Retransmission=1. This may cause layer 1 BLER to directly translate to PDCP SDU loss. The system 600 may then repeat the operations in blocks 605-620.

Alternatively, in block 626, before the actual test begins, the test entity may inject bad PDCP packets at predetermined interval to check if the UE accurately reports those bad PDCP packets as missed packets in the PDCP status report, which may allow the test entity to establish a baseline for conducting the actual test.

Figure 7A:
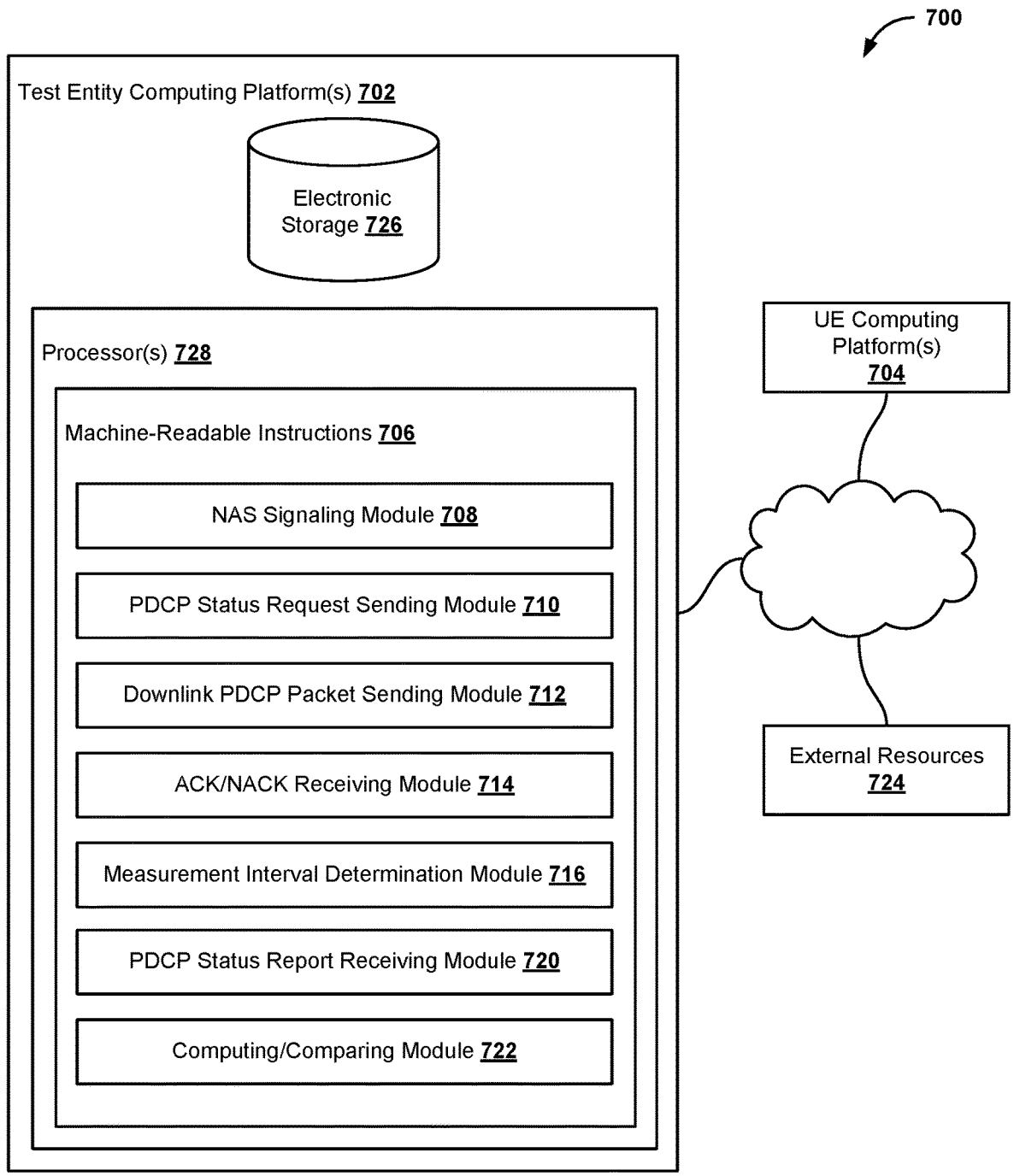
FIG. 7A is a component block diagram illustrating functional components in a test entity computing device that could be configured to verify layer 2 sustained downlink maximum data rate decoding performance in accordance with various embodiments.
Figure 7B:
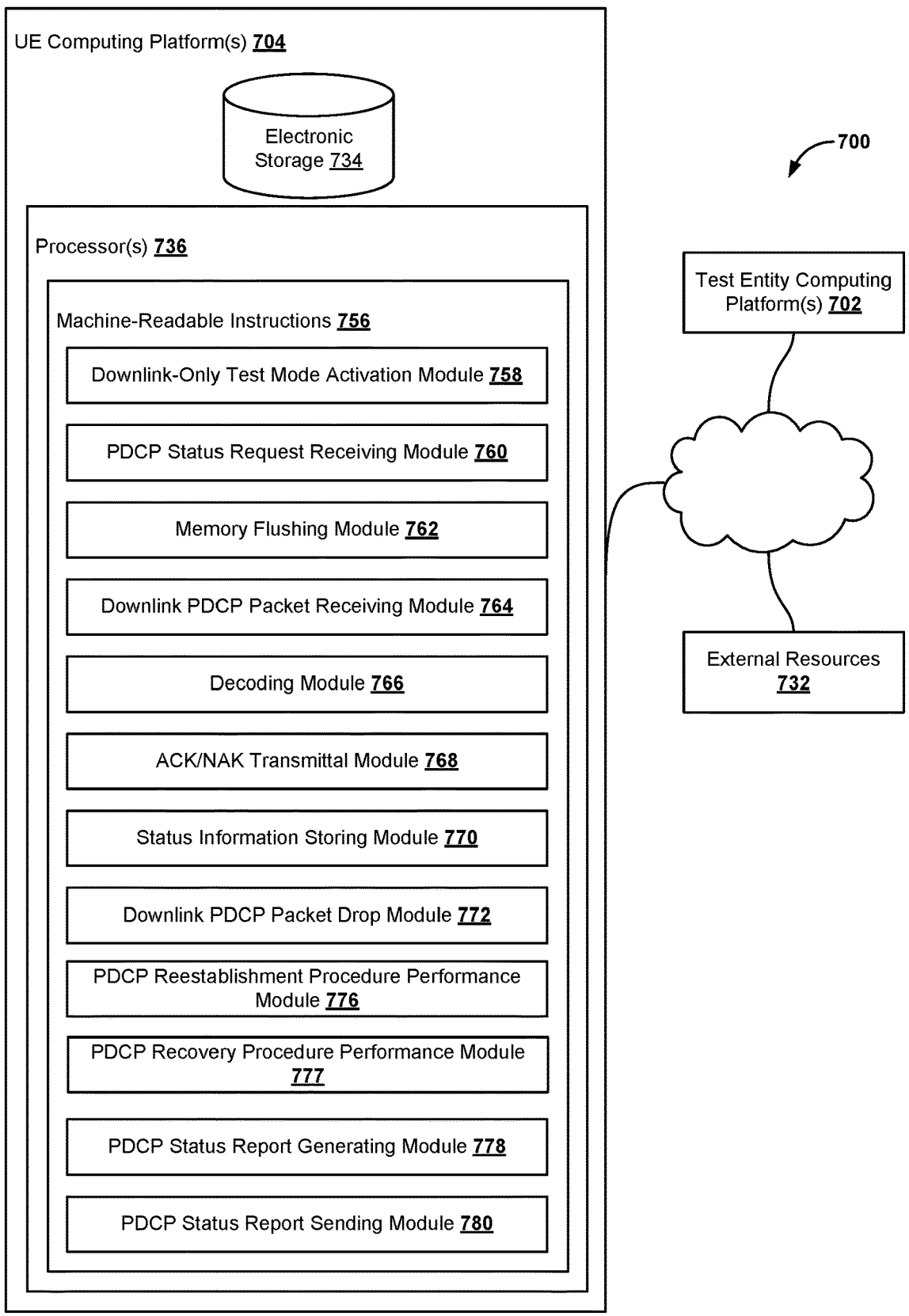
FIG. 7B is a component block diagram illustrating functional components in a UE device that could be configured to verify layer 2 sustained downlink maximum data rate decoding performance in accordance with various embodiments.

FIGS. 7A and 7B are component block diagrams illustrating a system 700 for verifying layer 2 sustained downlink maximum data rate decoding performance in accordance with various embodiments. In some embodiments, the system 700 may include one or more test entity computing devices 702 and/or one or more UE computing devices 704. The computing devices 702, 704 may include a base station (e.g., the base station 110a-110d, 350), test entity, and/or a UE device (e.g., the UE device 120a-120e, 320).

With reference to FIGS. 1-6 and 7A, a test entity computing device 702 may be configured by machine-readable instructions 706. Machine-readable instructions 706 may include one or more instruction modules. The instruction modules may include computer program modules. The instruction modules may include one or more of a NAS signaling module 708, a PDCP status request sending module 710, a downlink PDCP packet sending module 712, an ACK/NACK receiving module 714, a measurement interval determination module 716, a PDCP status report receiving module 720, a computing/comparing module 722, and/or other instruction modules.

The NAS signaling module 708 may be configured to receive a NAS signaling message that requests activation of a downlink-only test mode.

The PDCP status request sending module 710 may be configured to send a first PDCP status request to the UE device 704 in response to the NAS signaling module 708 receiving the NAS signaling message. In response, the UE device 704 may send a PDCP status report to the test entity computing device 702.

The downlink PDCP packet sending module 712 may be configured to commence sending downlink PDCP packets to the UE device 704 during a measurement interval in response to the PDCP status request sending module 710 sending the first PDCP status Request to the UE device.

The ACK/NACK receiving module 714 may be configured to commence receiving a PHY HARQ ACK/NACK message from the UE device and determining expected missed layer 1 packets based on information included in the received PHY HARQ ACK/NACK message.

The measurement interval determination module 716 may be configured to determine a measurement interval, activate measurement timers, and determine whether the measurement interval has lapsed.

The PDCP status request sending module 710 may be configured to send a PDCP status request to the UE device in response to the measurement interval determination module 716 determining that the measurement interval has lapsed.

The PDCP status report receiving module 720 may be configured to receive a PDCP status report from the UE device in response to the PDCP status request sending module 710 sending the second PDCP status Request to the UE device.

The computing/comparing module 722 may be configured to determine (e.g., compute) missed layer 2 packets from a First Missing Count (FMC) value or bitmap included in the received PDCP status report. In some embodiments, determining the missed layer 2 packets may include the computing/comparing module 722 comparing the expected missed layer 1 packets to the FMC value or bitmap containing missing packet sequence numbers included in the received PDCP status report to cross verify missed layer 2 packets. In some embodiments, the cross verification of the missed layer 2 packets may include the test entity (e.g., SS) configuring or setting DL MAX HARQ transmission=1 and RLC Max Retransmission=1. Alternatively, before the actual test begins, the test entity may inject bad PDCP packets at predetermined interval to check if the UE accurately reports those bad PDCP packets as missed packets in the PDCP status report, which may allow the test entity to establish a baseline for conducting the actual test.

With reference to FIGS. 1-6 and 7B, UE computing devices 704 may be configured by machine-readable instructions 756. Machine-readable instructions 756 may include one or more instruction modules. The instruction modules may include computer program modules. The instruction modules may include one or more of a downlink-only test mode activation module 758, PDCP status request receiving module 760, memory flushing module 762, downlink PDCP packet receiving module 764, decoding module 766, ACK/NAK transmittal module 768, status information storing module 770, downlink PDCP packet drop module 772, PDCP reestablishment procedure performance module 776, PDCP recovery procedure performance module 777, PDCP status report generating module 778, PDCP status report sending module 780, and/or other instruction modules.

The downlink-only test mode activation module 758 may be configured to activate a loopback mode, a "PDCP Downlink only data operation," or a downlink-only test mode. In some embodiments, the downlink-only test mode activation module 758 may activate the downlink-only test mode by suppressing user plane data in the UE device and sending a TC message or a NAS signaling message to the test entity 702.

The PDCP status request receiving module 760 may be configured to receive PDCP status request from the test entity. The PDCP status request receiving module 760 may receive a first PDCP status request from the test entity in response to sending the TC message or NAS signaling message to the test entity, and in response, instruct the memory flushing module 762 to flush a memory of the UE device of received downlink PDCP packets and decode status information. The PDCP status request receiving module 760 may receive a second PDCP status request from the test entity after the measurement interval, and in response, instruct the PDCP reestablishment procedure performance module 776 or the PDCP recovery procedure performance module 777 to use decode status information stored in memory of the UE to determine a FMC value and identify missing packet sequence numbers.

The memory flushing module 762 may be configured to flush a memory of the UE device of received downlink PDCP packets and decode status information in response to receiving the first PDCP status request.

The downlink PDCP packet receiving module 764 may be configured to receive downlink PDCP packets from the test entity during a measurement interval after flushing the memory of received downlink PDCP packets and decode status information.

The decoding module 766 may be configured to decode the received downlink PDCP packets.

The ACK/NAK transmittal module 768 may be configured to transmit a PHY HARQ ACK/NACK message to the test entity via the PUSCH or PUCCH as the decoding module 766 decodes the received downlink PDCP packets.

The status information storing module 770 may be configured to decode status information in a memory of the UE device.

The downlink PDCP packet drop module 772 may be configured to drop the received downlink PDCP packets in response to storing the decode status information in the memory.

The PDCP reestablishment procedure performance module 776 and/or the PDCP recovery procedure performance module 777 may be configured to perform PDCP reestablishment and PDCP recovery procedures, which may include using decode status information stored in memory to determine a First Missing Count (FMC) value and identify missing packet sequence numbers in response to receiving the second PDCP status request from the test entity.

The PDCP status report generating module 778 may be configured to generate a PDCP status report that includes the FMC value and a bitmap containing missing packet sequence numbers.

The PDCP status report sending module 780 may be configured to send the generated PDCP status report to the test entity.

FIGS. 8A, 8B, 8C, 8D, and/or 8E, illustrates operations of the method 800 that may be performed by a processor of a UE device for verifying layer 2 sustained downlink maximum data rate decoding performance in accordance with various embodiments. The operations of the method 800 presented below are intended to be illustrative. In some embodiments, the method 800 may be accomplished with one or more additional operations not described, and/or without one or more of the operations discussed. Additionally, the order in which the operations of the method 800 are illustrated in FIGS. 8A, 8B, 8C, 8D, and/or 8E and described below is not intended to be limiting.

In some embodiments, the method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 800 in response to instructions stored electronically on an electronic storage medium. The one or more processing devices may include one or more devices configured through hardware, firmware, and/or software to be specifically designed for execution of one or more of the operations of the method 800. For example, with reference to FIGS. 1-8A, 8B, 8C, 8D, and/or 8E, the operations of the method 800 may be performed by a processor of a base station (e.g., the base station 110a-110d, 350) and/or a UE device (e.g., the UE device 120a-120e, 320). Further, the operations of the method 800 illustrated in FIGS. 8A-8E may be performed by one or more hardware processors configured by machine-readable instructions stored in a non-transitory storage medium that are the same as or similar to modules described with reference to FIGS. 7A and 7B.

Operations performed by the processing device in blocks 802-824 may include execution of instructions of the downlink-only test mode activation module 758, PDCP status request receiving module 760, memory flushing module 762, downlink PDCP packet receiving module 764, decoding module 766, ACK/NAK transmittal module 768, status information storing module 770, downlink PDCP packet drop module 772, PDCP reestablishment procedure performance module 776, PDCP recovery procedure performance module 777, PDCP status report generating module 778, and/or PDCP status report sending module 780 described with reference to FIG. 7B.

Operations performed by the processing device in blocks 826-832 may include execution of instructions of the NAS signaling module 708, PDCP status request sending module 710, downlink PDCP packet sending module 712, ACK/NACK receiving module 714, measurement interval determination module 716, PDCP status report receiving module 720, and/or computing/comparing module 722 described with reference to FIG. 7A.

Figure 8A:
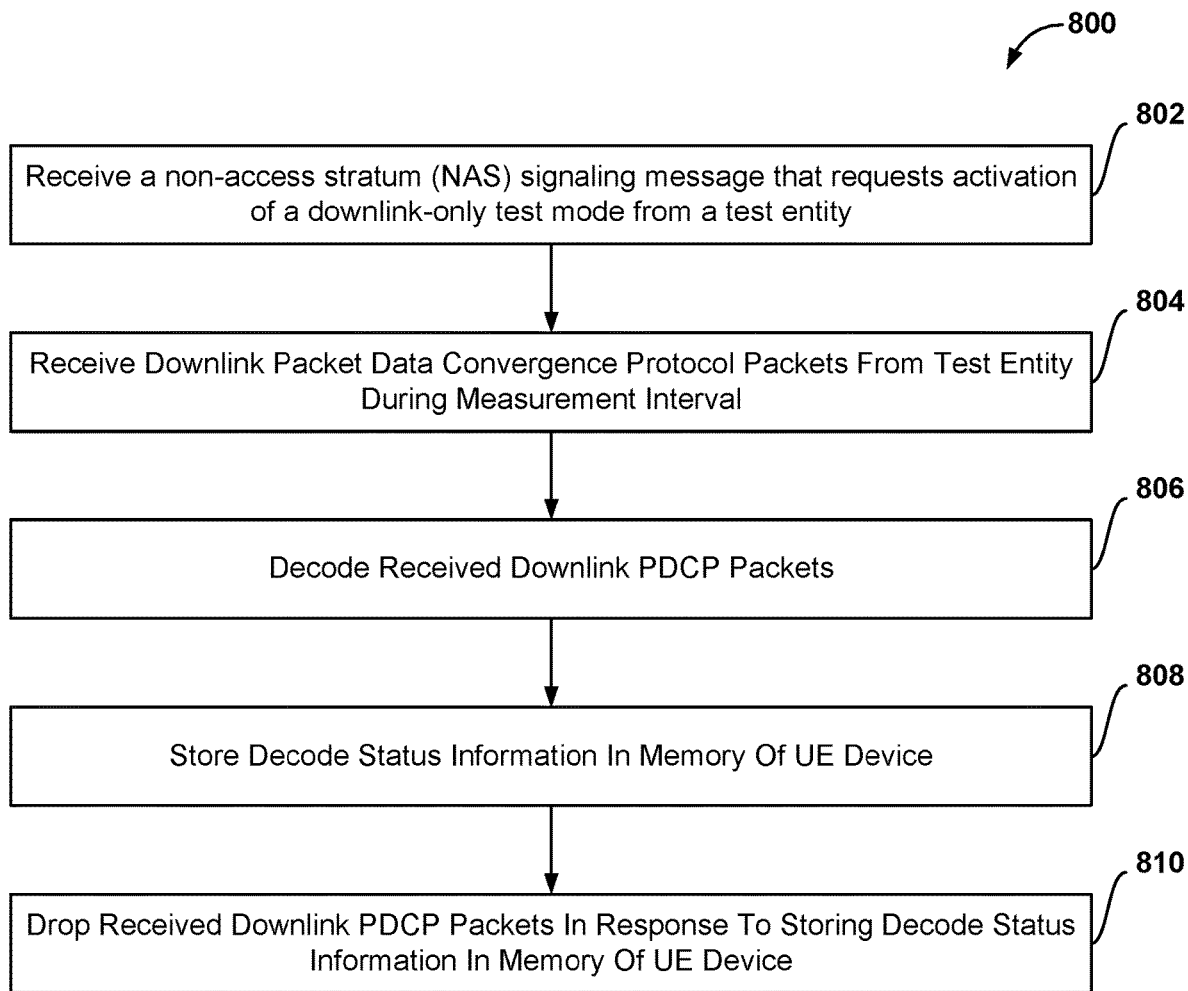
FIGS. 8A, 8B, 8C, 8D, and/or 8E are process flow diagrams illustrating operations of methods for verifying layer 2 sustained downlink maximum data rate decoding performance of a UE device in accordance with various embodiments.

FIG. 8A illustrates operations of the method 800, which may be performed by one or more processors in accordance with some embodiments. In block 802, a processing device (e.g., UE, etc.) may receive a non-access stratum (NAS) signaling message that requests activation of a downlink-only test mode from a test entity. In block 804, the processing device may receive downlink PDCP packets from the test entity during a measurement interval. In block 806, the processing device may perform operations including decoding the received downlink PDCP packets. In block 808, the processing device may perform operations including storing decode status information in a memory of the UE device. In block 810, the processing device may perform operations including dropping the received downlink PDCP packets in response to storing the decode status information in the memory of the UE device.

Figure 8B:
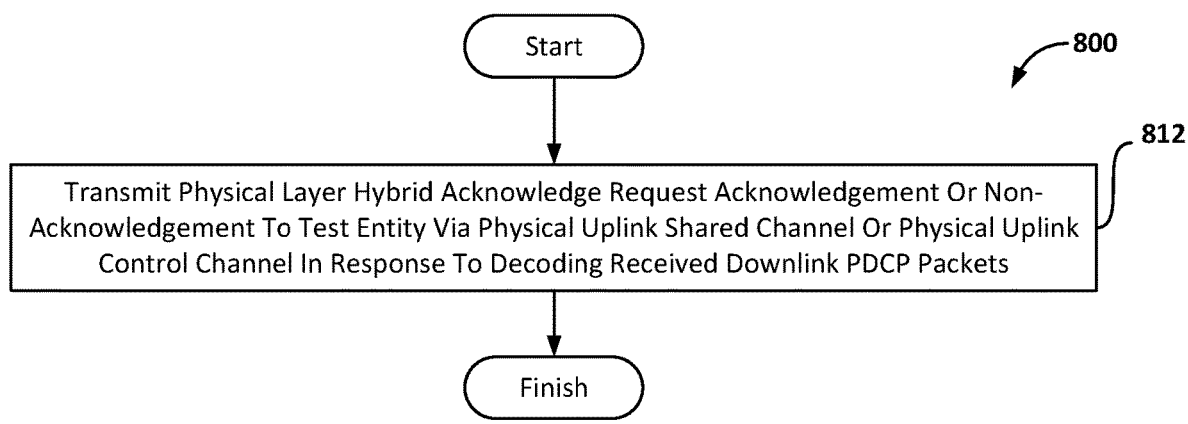

FIG. 8B illustrates a further operation of the method 800, which may be performed by one or more processors in accordance with some embodiments. In block 812, the processing device may perform operations including further including transmitting a PHY HARQ ACK/NACK to the test entity via the PUSCH or the PUCCH in response to decoding the received downlink PDCP packets.

Figure 8C:
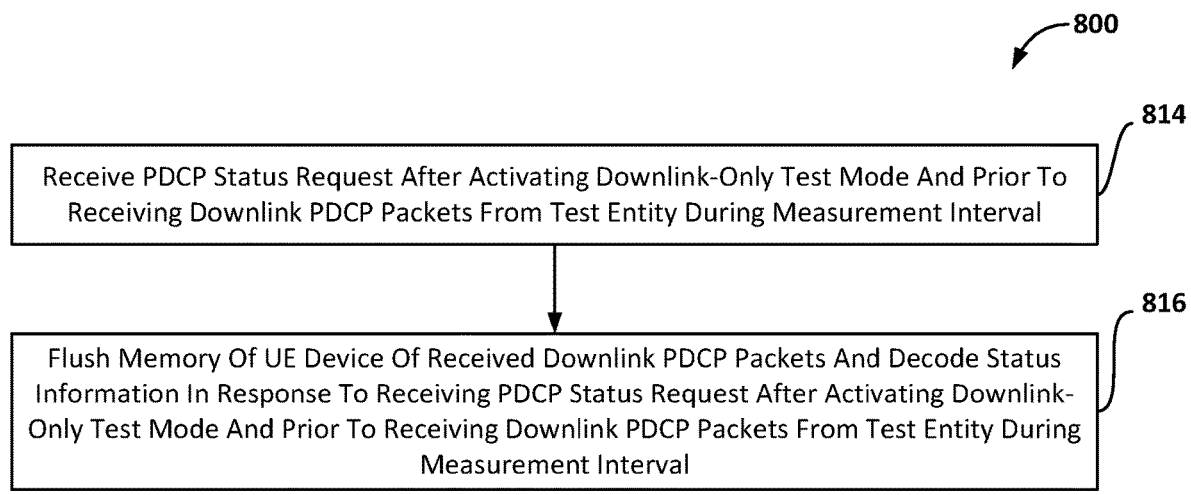

FIG. 8C illustrates further operations of the method 800, which may be performed by one or more processors in accordance with some embodiments. In block 814, the processing device may perform operations including receiving a PDCP status request after activating the downlink-only test mode and prior to receiving the downlink PDCP packets from the test entity during the measurement interval. In block 816, the processing device may perform operations including flushing the memory of the UE device of received downlink PDCP packets and decode status information in response to receiving the PDCP status request after activating the downlink-only test mode and prior to receiving the downlink PDCP packets from the test entity during the measurement interval.

Figure 8D:
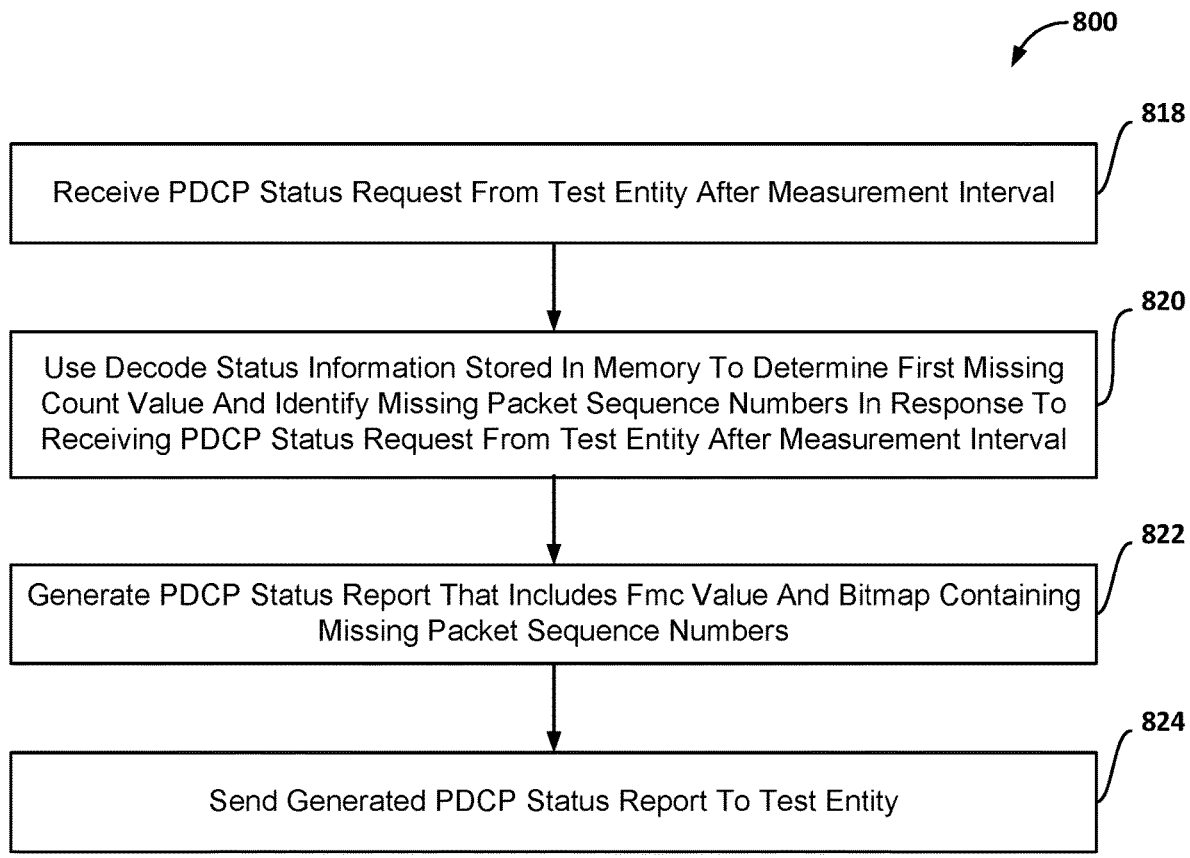

FIG. 8D illustrates further operations of the method 800, which may be performed by one or more processors in accordance with some embodiments. In block 818, the processing device may perform operations including receiving a PDCP status request from the test entity after the measurement interval. In block 820, the processing device may perform operations including using the decode status information stored in memory to determine FMC value and identify missing packet sequence numbers in response to receiving the PDCP status request from the test entity after the measurement interval. In block 822, the processing device may perform operations including generating a PDCP status report that includes the FMC value and a bitmap containing missing packet sequence numbers. In block 824, the processing device may perform operations including sending the generated PDCP status report to the test entity.

Figure 8E:
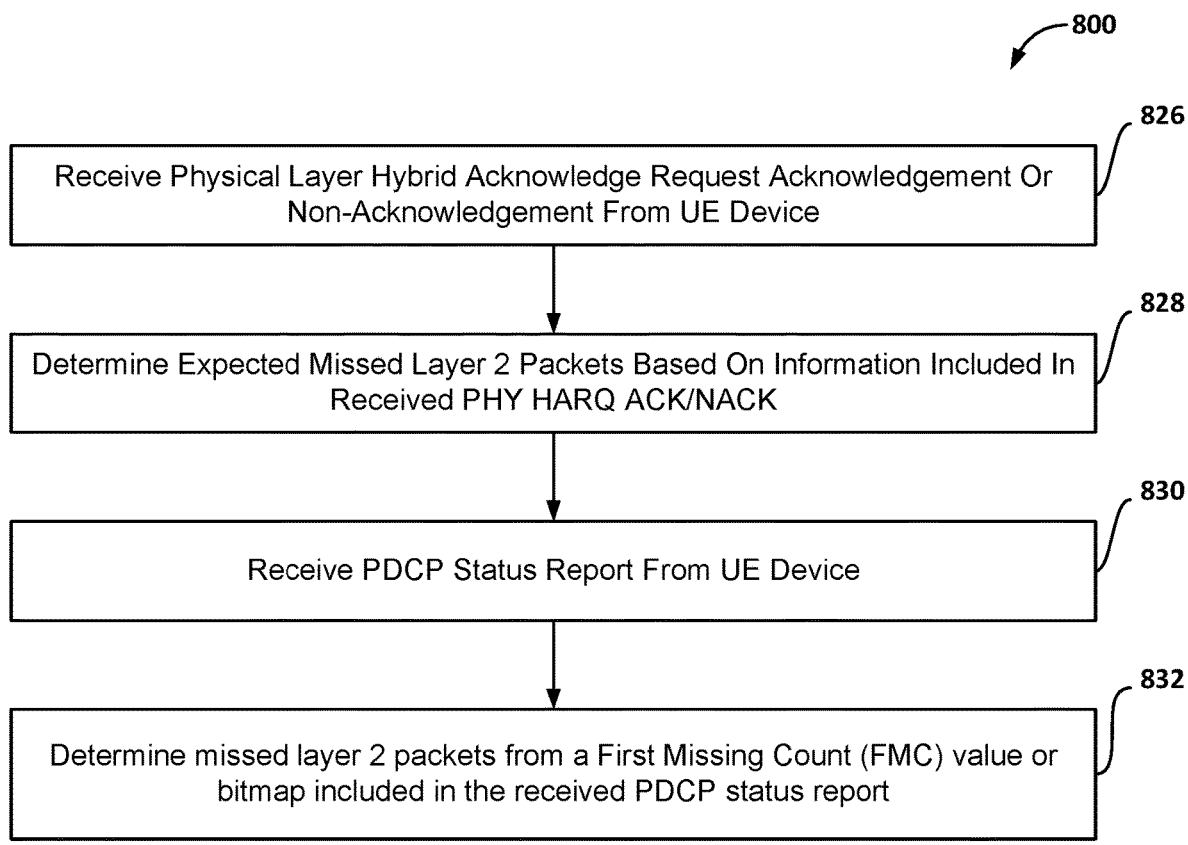

FIG. 8E illustrates further operations of the method 800, which may be performed by one or more processors in accordance with some embodiments. In block 826, the processing device may perform operations including receiving, by a processor in the test entity, a PHY HARQ ACK/NACK from the UE device. In block 828, the processing device may perform operations including determining, by the processor in the test entity, expected missed layer 1 packets based on information included in the received PHY HARQ ACK/NACK. In block 830, the processing device may perform operations including receiving, by the processor in the test entity, the PDCP status report from the UE device.

In block 832, the processing device may perform operations including determining missed layer 2 packets from a First Missing Count (FMC) value or bitmap included in the received PDCP status report. In some embodiments, in block 832, the processing device may compare the expected missed layer 1 packets to the FMC value or bitmap containing missing packet sequence numbers included in the received PDCP status report to cross verify missed layer 2 packets. In some embodiments, the cross verification of the missed layer 2 packets may include the test entity (e.g., SS) configuring or setting DL MAX HARQ transmission=1 and RLC Max Retransmission=1. Alternatively, before the actual test begins, the test entity may inject bad PDCP packets at predetermined interval to check if the UE accurately reports those bad PDCP packets as missed packets in the PDCP status report, which may allow the test entity to establish a baseline for conducting the actual test.

Figure 9:
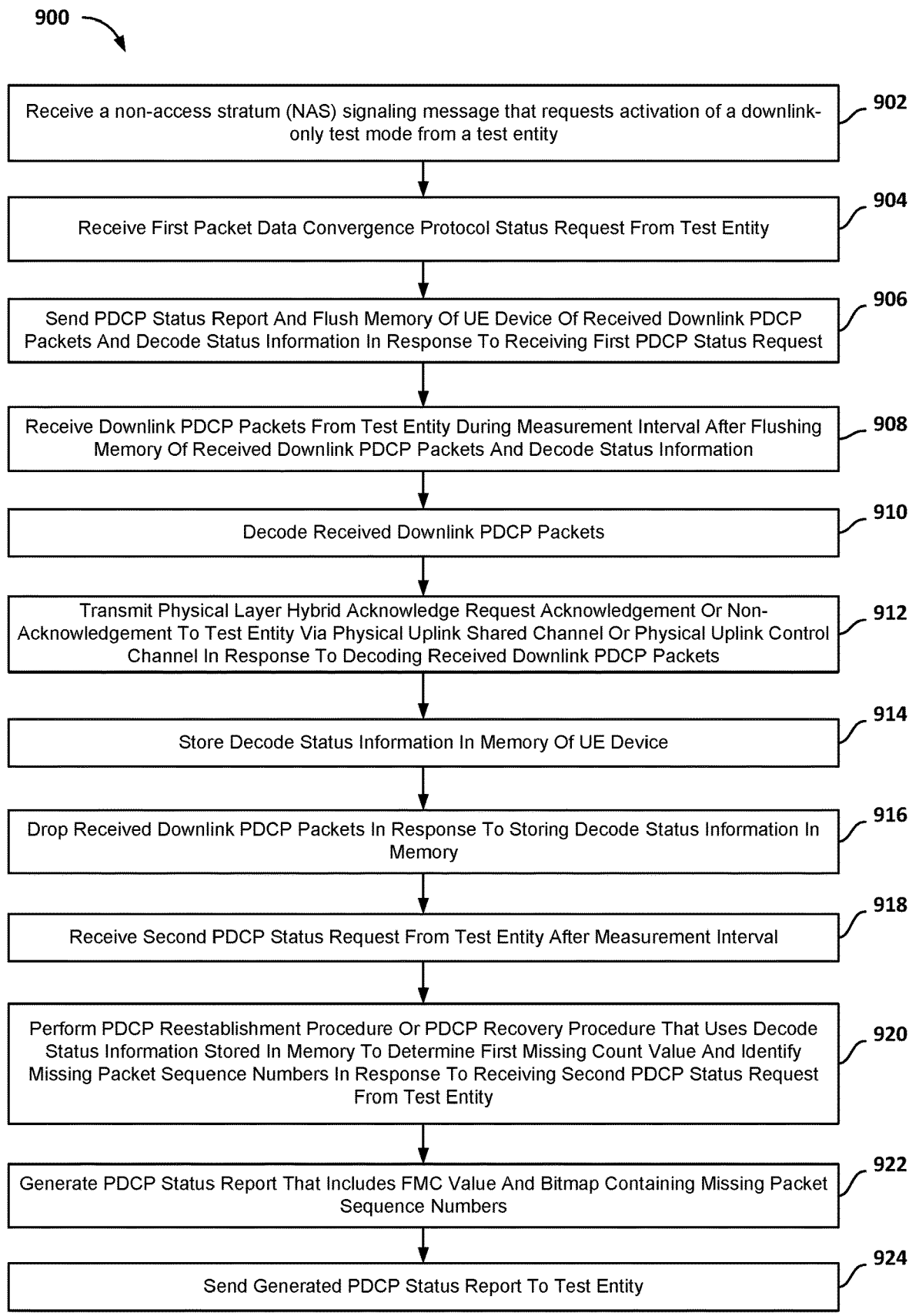
FIG. 9 illustrate operations of methods performed by a processor for verifying layer 2 sustained downlink maximum data rate decoding performance of a UE device in accordance with some embodiments.

FIG. 9 illustrates operations of a method 900 performed by a processor of a user equipment device's for verifying layer 2 sustained downlink maximum data rate decoding performance in accordance with various embodiments. The operations of the method 900 presented below are intended to be illustrative. In some embodiments, the method 900 may be accomplished with one or more additional operations not described, and/or without one or more of the operations discussed. Additionally, the order in which the operations of the method 900 are illustrated in FIG. 9 and described below is not intended to be limiting.

In some embodiments, the method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 900 in response to instructions stored electronically on an electronic storage medium. The one or more processing devices may include one or more devices configured through hardware, firmware, and/or software to be specifically designed for execution of one or more of the operations of the method 900. For example, with reference to FIGS. 1-8E, the operations of the method 900 may be performed by a processor of a base station (e.g., the base station 110a-110d, 350) and/or a wireless device (e.g., the UE device 120a-120e, 320).

Operations performed by the processing device in blocks 902-924 may include execution of instructions of the downlink-only test mode activation module 758, PDCP status request receiving module 760, memory flushing module 762, downlink PDCP packet receiving module 764, decoding module 766, ACK/NAK transmittal module 768, status information storing module 770, downlink PDCP packet drop module 772, PDCP reestablishment procedure performance module 776, PDCP recovery procedure performance module 777, PDCP status report generating module 778, and/or PDCP status report sending module 780 described with reference to FIG. 7B.

In block 902, the processing device may perform operations including receiving a Test Control message or a non-access stratum (NAS) signaling message that requests activation of a downlink-only test mode from a test entity.

In block 904, the processing device may perform operations including receiving a First Packet Data Convergence Protocol Status Request from the Test entity in response to receiving the TC message or NAS signaling message to the Test entity.

In block 906, the processing device may perform operations including sending a PDCP status report and flushing a memory of the UE device of received downlink PDCP packets and decode status information in response to receiving the First PDCP status Request.

In block 908, the processing device may perform operations including receiving downlink PDCP packets from the Test entity during a measurement interval after flushing the memory of received downlink PDCP packets and decode status information.

In block 910, the processing device may perform operations including decoding the received downlink PDCP packets.

In block 912, the processing device may perform operations including transmitting a Physical layer Hybrid Acknowledge Request acknowledgement or non-acknowledgement to the Test entity via the Physical Uplink Shared Channel or the Physical Uplink Control Channel in response to decoding the received downlink PDCP packets.

In block 914, the processing device may perform operations including storing decode status information in a memory of the UE device.

In block 916, the processing device may perform operations including dropping the received downlink PDCP packets in response to storing the decode status information in the memory.

In block 918, the processing device may perform operations including receiving a second PDCP status Request from the Test entity after the measurement interval.

In block 920, the processing device may perform operations including performing a PDCP reestablishment procedure or a PDCP recovery procedure that uses the decode status information stored in memory to determine First Missing Count value and identify Missing Packet sequence numbers in response to receiving the second PDCP status Request from the Test entity.

In block 922, the processing device may perform operations including generating a PDCP status report that includes the FMC value and a bitmap containing Missing Packet sequence numbers.

In block 924, the processing device may perform operations including sending the generated PDCP status report to the Test entity.

Figure 10:
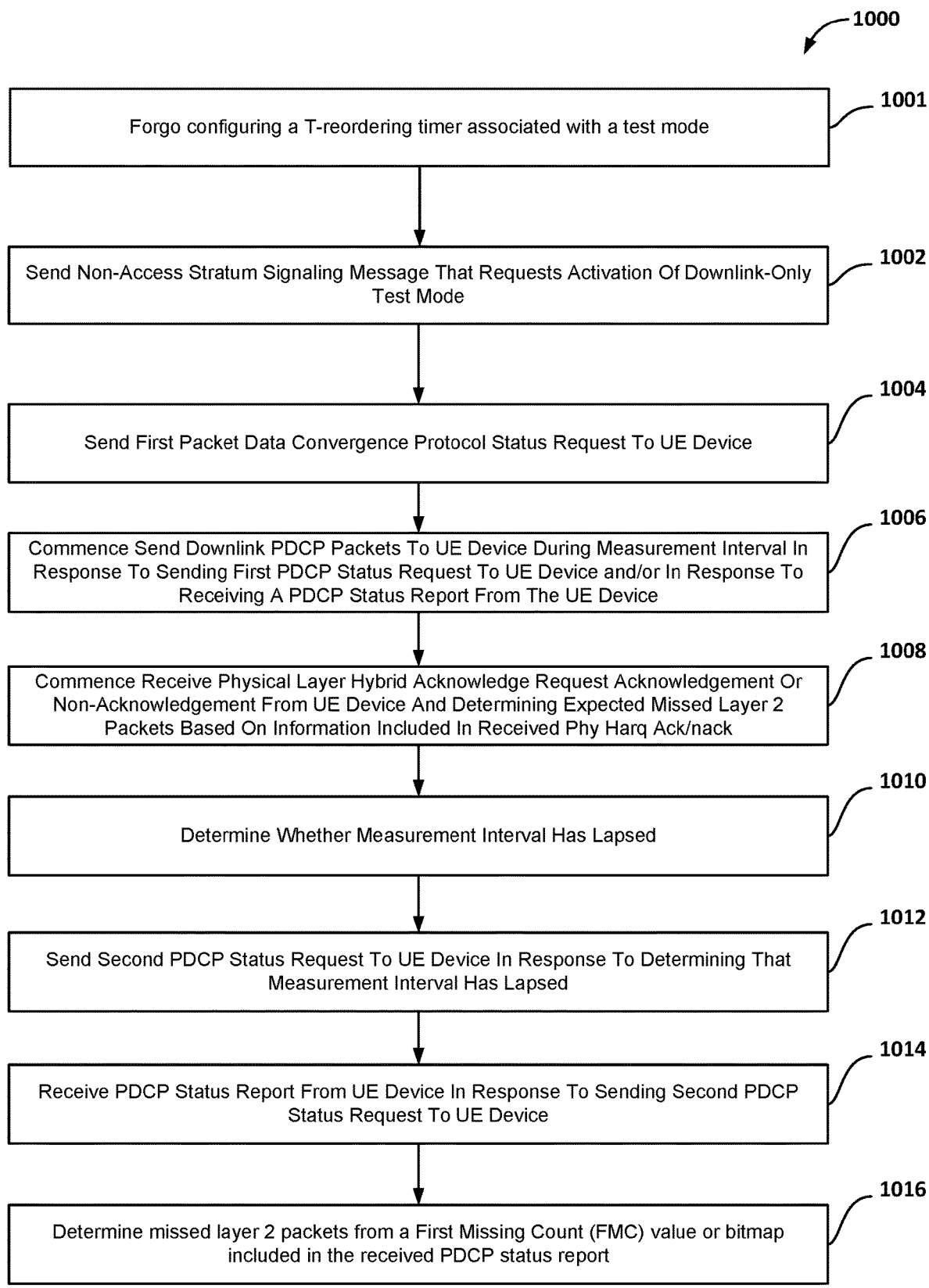
FIG. 10 illustrate operations of methods performed by a processor in a test entity for verifying a user equipment device's layer 2 sustained downlink maximum data rate decoding performance in accordance with various embodiments.

FIG. 10 illustrate operations of methods 1000 performed by a processor in a test entity for verifying a user equipment device's layer 2 sustained downlink maximum data rate decoding performance described with reference to FIG. 7B. The operations of the method 1000 presented below are intended to be illustrative. In some embodiments, the method 1000 may be accomplished with one or more additional operations not described, and/or without one or more of the operations discussed. Additionally, the order in which the operations of the method 1000 are illustrated in FIG. 10 and described below is not intended to be limiting.

In some embodiments, the method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 1000 in response to instructions stored electronically on an electronic storage medium. The one or more processing devices may include one or more devices configured through hardware, firmware, and/or software to be specifically designed for execution of one or more of the operations of the method 1000. For example, with reference to FIGS. 1-9, the operations of the method 1000 may be performed by a processor of a base station (e.g., the base station 110a-110d, 350) and/or a wireless device (e.g., the UE device 120a-e, 320).

Operations performed by the processing device in blocks 1002-1016 may include execution of instructions of the NAS signaling module 708, PDCP status request sending module 710, downlink PDCP packet sending module 712, ACK/NACK receiving module 714, measurement interval determination module 716, PDCP status report receiving module 720, and/or computing/comparing module 722 described with reference to FIG. 7A.

In block 1001, the processing device may perform operations including forgoing configuring a T-reordering timer associated with a test mode.

In block 1002, the processing device may perform operations including sending a Non-Access Stratum signaling message that requests activation of a downlink-only test mode (e.g., test mode that does not require the test entity to configure the T-reordering timer, etc.). The downlink-only test mode may be a new test mode (e.g., New Test Mode X, etc.) or an existing test mode that is modified so that it does not loopback data to the test entity in an uplink. In some embodiments, in block 1002, the processing device may modify an existing test mode to not loopback data to the test entity computing device in an uplink by setting select payload bits in the NAS signaling message.

In block 1004, the processing device may perform operations including sending a first Packet Data Convergence Protocol Status Request to the UE device in response to sending the NAS signaling message.

In block 1006, the processing device may commence sending downlink PDCP packets to the UE device during a measurement interval in response to sending the a first PDCP status Request to the UE device and/or in response to receiving a PDCP status report from the UE device.

In block 1008, the processing device may commence receiving a physical layer Hybrid Acknowledge Request acknowledgement or non-acknowledgement from the UE device and determining expected missed layer 1 packets based on information included in the received PHY HARQ ACK/NACK.

In block 1010, the processing device may perform operations including determining whether the measurement interval has lapsed.

In block 1012, the processing device may perform operations including sending a second PDCP status Request to the UE device in response to determining that the measurement interval has lapsed.

In block 1014, the processing device may perform operations including receiving a PDCP status report from the UE device in response to sending the second PDCP status Request to the UE device.

In block 1016, the processing device may perform operations including determining or computing missed layer 2 packets from a First Missing Count (FMC) value or bitmap included in the received PDCP status report. In some embodiments, in block 1016, the processing device may compare the expected missed layer 1 packets to the FMC value or bitmap containing missing Packet sequence numbers included in the received PDCP status report to cross verify missed layer 2 packets.

Figure 11:
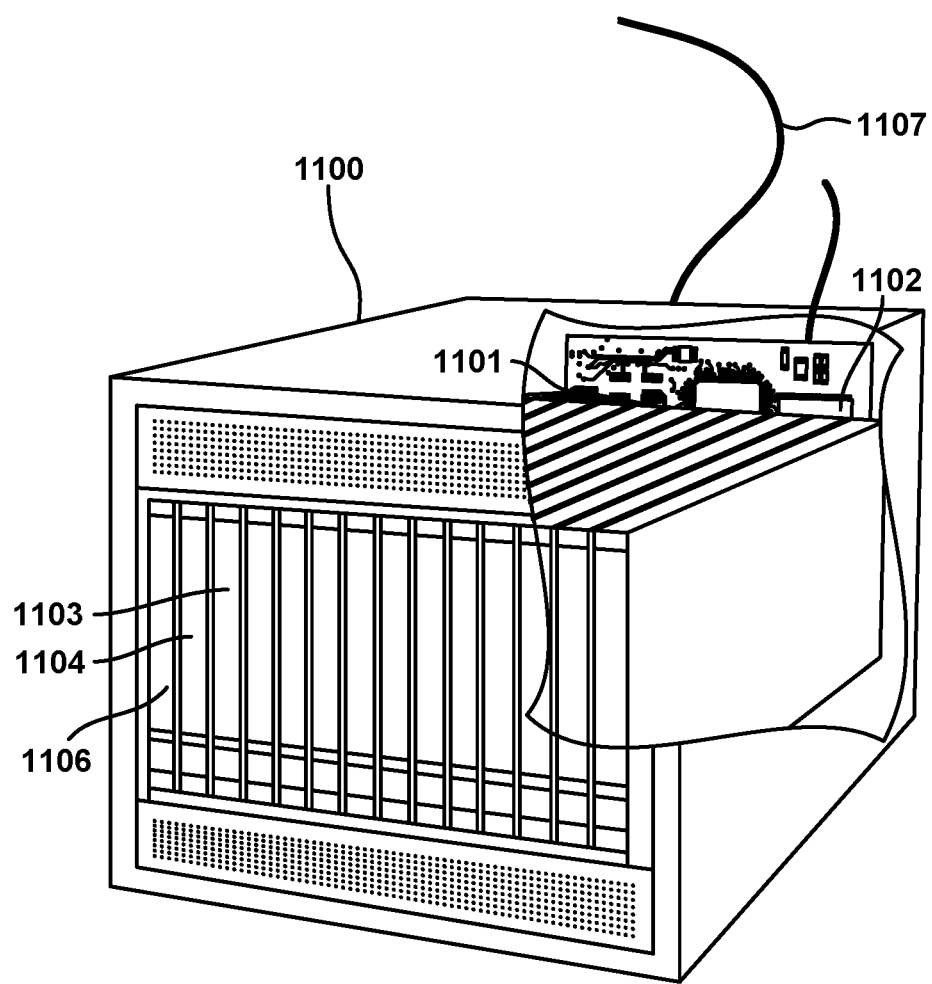
FIG. 11 is a component block diagram of a computing device suitable for use as a test entity for verifying layer 2 sustained downlink maximum data rate decoding performance of UE devices in accordance with various embodiments.

Various embodiments may be implemented on a variety of wireless network devices, an example of which is illustrated in FIG. 11 in the form of a wireless network computing device 1100 functioning as a network element of a communication network, such as a base station. Such network computing devices may include at least the components illustrated in FIG. 11. With reference to FIGS. 1-10, the network computing device 1100 may typically include a processor 1101 coupled to volatile memory 1102 and a large capacity nonvolatile memory, such as a disk drive 1103. The network computing device 1100 may also include a peripheral memory Access device such as a floppy disc drive, compact disc (CD) or digital video disc (DVD) drive 1106 coupled to the processor 1101. The network computing device 1100 may also include network access ports 1110a-1110d (or interfaces) coupled to the processor 1101 for establishing data connections with a network 1107, such as the Internet and/or a local area network coupled to other system computers and servers. The network computing device 1100 may include one or more antennas 1107 for sending and receiving electromagnetic radiation that may be connected to a wireless communication link. The network computing device 1100 may include additional Access ports, such as USB, Firewire, Thunderbolt, and the like for coupling to peripherals, external memory, or other devices.

Figure 12:
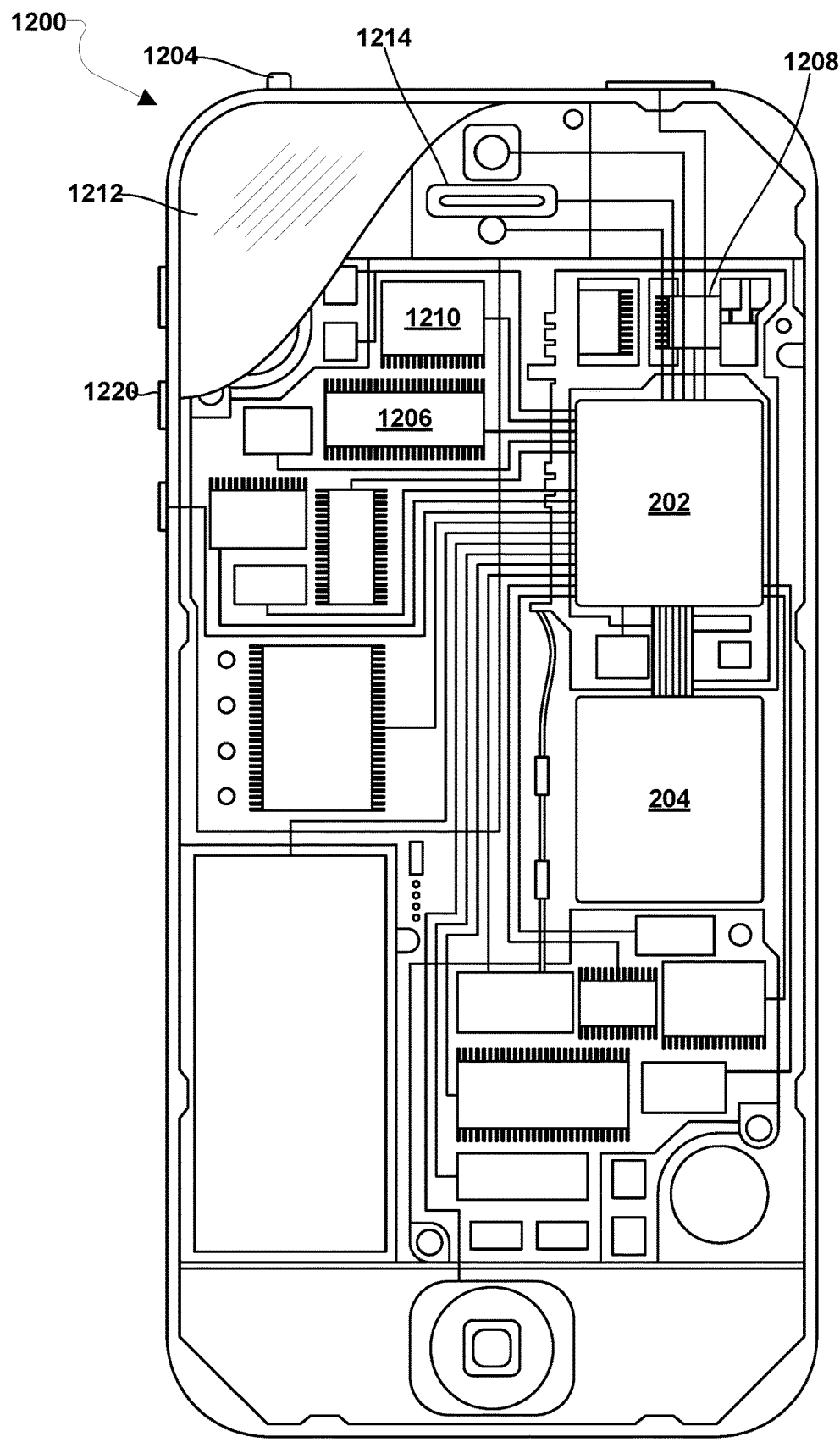
FIG. 12 is a component block diagram of a UE device suitable performed by a processor of a user equipment device for verifying layer 2 sustained downlink maximum data rate decoding performance in accordance with various embodiments.

Various embodiments may be implemented on a variety of UE devices (e.g., the UE device 120a-120e, 320), an example of which is illustrated in FIG. 12 in the form of a smartphone 1200. The smartphone 1200 may include a first SOC 202 (e.g., a SOC-CPU) coupled to a second SOC 204 (e.g., a 5G capable SOC). The first and second SOCs 202, 204 may be coupled to internal memory 1206 a display 1212, and to a speaker 1214. Additionally, the smartphone 1200 may include an antenna 1204 for sending and receiving electromagnetic radiation that may be connected to a wireless data link and/or cellular telephone transceiver 1208 coupled to one or more processors in the first and/or second SOCs 202, 204. Smartphones 1200 typically also include menu selection buttons or rocker switches 1220 for receiving user inputs.

A typical smartphone 1200 also includes a sound encoding/decoding (CODEC) circuit 1210, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1208 and CODEC 1210 may include a digital signal processor (DSP) circuit (not shown separately).

The processors of the wireless network computing device 1100 and the smartphone 1200 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1206 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a UE device and the UE device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple Access (CDMA) systems (e.g., cdmaOne, CDMA1020TM), Wideband Code Division Multiple Access (WCDMA), Time Division Multiple Access (TDMA), orthogonal frequency division multiplexing (OFDM), single-carrier frequency division multiplexing (SC-FDM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 800-1200 may be substituted for or combined with one or more operations of the methods 800-1200.

The foregoing the method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor in a test entity for layer 2 sustained downlink maximum data rate decoding performance of a user equipment device, comprising:
   sending to the user equipment device a non-access stratum (NAS) signaling message that requests at least one or more of:
      activation of a new downlink-only test mode that does not loopback data to the test entity in an uplink; or
      activation of a modified downlink-only test mode that does not loopback data to the test entity in the uplink;
   sending a first Packet Data Convergence Protocol (PDCP) status request to the user equipment device;
   sending downlink PDCP packets to the user equipment device during a measurement interval after sending the first PDCP status request to the user equipment device;
   receiving a physical layer (PHY) hybrid acknowledge request (HARQ) acknowledgement (ACK) or non-acknowledgement (NACK) from the user equipment device and determining expected missed layer 1 packets based on information included in the received PHY HARQ ACK/NACK;
   sending a second PDCP status request to the user equipment device after the measurement interval;
   receiving a PDCP status report from the user equipment device in response to the second PDCP status request; and
   determining missed layer 2 packets from a First Missing Count (FMC) value or bitmap included in the received PDCP status report.

2. The method of claim 1, further comprising:
   forgoing configuring a T-reordering timer associated with at least one or more of:
      the new downlink-only test mode; or
      the modified downlink-only test mode.

3. The method of claim 1, wherein sending to the user equipment device the NAS signaling message that requests activation of the modified downlink-only test mode that does not loopback data to the test entity in the uplink comprises:
   sending a NAS signaling message that requests activation of a modified User Equipment Test Loop Function Test Loop Mode A that does not loopback data to the test entity in the uplink.

4. The method of claim 1, further comprising modifying an existing test mode to not loopback data to the test entity in the uplink.

5. The method of claim 4, wherein modifying the existing test mode to not loopback data to the test entity in the uplink comprises setting payload bits in the NAS signaling message.

6. The method of claim 1, further comprising:
   setting DL MAX HARQ transmission=1 and RLC Max Retransmission=1.

7. The method of claim 1, further comprising before a test begins:
   injecting a bad PDCP packet at predetermined interval;
   determining whether the user equipment device accurately reports those bad PDCP packets as missed packets in the PDCP status report; and
   using a result of determining whether the user equipment device accurately reports those bad PDCP packets as missed packets in the PDCP status report as a baseline for conducting the test.

8. A test entity computing device, comprising:
   a processor configured with processor-executable software instructions to:
      send to a user equipment device a non-access stratum (NAS) signaling message that requests at least one or more of:
         activation of a new downlink-only test mode that does not loopback data to the test entity computing device in an uplink; or
         activation of a modified downlink-only test mode that does not loopback data to the test entity computing device in the uplink;
      send a first Packet Data Convergence Protocol (PDCP) status request to the user equipment device;
      send downlink PDCP packets to the user equipment device during a measurement interval in response after the first PDCP status request to the user equipment device;
      receive a physical layer (PHY) hybrid acknowledge request (HARQ) acknowledgement (ACK) or non-acknowledgement (NACK) from the user equipment device and determine expected missed layer 1 packets based on information included in the received PHY HARQ ACK/NACK;
      send a second PDCP status request to the user equipment device after the measurement interval;
      receive a PDCP status report from the user equipment device in response to the second PDCP status request; and
      determining missed layer 2 packets from a First Missing Count (FMC) value or bitmap included in the received PDCP status report.

9. The test entity computing device of claim 8, wherein the processor is further configured with processor-executable software instructions to forego configuring a T-reordering timer associated with at least one or more of:
   the new downlink-only test mode; or
   the modified downlink-only test mode.

10. The test entity computing device of claim 8, wherein the processor is further configured with processor-executable software instructions to send the NAS signaling message that requests activation of the modified downlink-only test mode that does not loopback data to the test entity computing device in the uplink by:
   sending a NAS signaling message that requests activation of a modified User Equipment Test Loop Function Test Loop Mode A that does not loopback data to the test entity computing device in the uplink.

11. The test entity computing device of claim 8, wherein the processor is further configured with processor-executable software instructions to modify an existing test mode to not loopback data to the test entity computing device in the uplink.

12. The test entity computing device of claim 11, wherein the processor is further configured with processor-executable software instructions to modify the existing test mode to not loopback data to the test entity computing device in the uplink by setting payload bits in the NAS signaling message.

13. The test entity computing device of claim 8, wherein the processor is further configured with processor-executable software instructions to:
   set DL MAX HARQ transmission=1 and RLC Max Retransmission=1.

14. The test entity computing device of claim 8, wherein the processor is further configured with processor-executable software instructions to before a test begins:
- inject a bad PDCP packet at predetermined interval;
- determine whether the user equipment device accurately reports those bad PDCP packets as missed packets in the PDCP status report; and
- use a result of determining whether the user equipment device accurately reports those bad PDCP packets as missed packets in the PDCP status report as a baseline for conducting the test.

15. A non-transitory computer readable storage medium having stored thereon processor-executable software instructions configured to cause a processor in a test entity computing device to perform operations comprising:
- sending to a user equipment device a non-access stratum (NAS) signaling message that requests at least one or more of:
  - activation of a new downlink-only test mode that does not loopback data to the test entity computing device in an uplink; or
  - activation of a modified downlink-only test mode that does not loopback data to the test entity computing device in an uplink;
- sending a first Packet Data Convergence Protocol (PDCP) status request to the user equipment device;
- sending downlink PDCP packets to the user equipment device during a measurement interval after to sending the first PDCP status request to the user equipment device;
- receiving a physical layer (PHY) hybrid acknowledge request (HARQ) acknowledgement (ACK) or non-acknowledgement (NACK) from the user equipment device and determining expected missed layer 1 packets based on information included in the received PHY HARQ ACK/NACK;
- sending a second PDCP status request to the user equipment device after the measurement interval;
- receiving a PDCP status report from the user equipment device in response to the second PDCP status request; and
- determining missed layer 2 packets from a First Missing Count (FMC) value or bitmap included in the received PDCP status report.

16. The non-transitory computer readable storage medium of claim 15, wherein the stored processor-executable software instructions are configured to cause the processor in the test entity computing device to perform operations further comprising forgoing configuring a T-reordering timer associated with at least one or more of:
- the new downlink-only test mode; or
- the modified downlink-only test mode.

17. The non-transitory computer readable storage medium of claim 15, wherein the stored processor-executable software instructions are configured to cause the processor in the test entity computing device to perform operations such that sending the NAS signaling message that requests activation of the modified downlink-only test mode that does not loopback data to the test entity computing device in the uplink by:
- sending a NAS signaling message that requests activation of a modified User Equipment Test Loop Function Test Loop Mode A that does not loopback data to the test entity computing device in the uplink.

18. The non-transitory computer readable storage medium of claim 15, wherein the stored processor-executable software instructions are configured to cause the processor in the test entity computing device to perform operations such that modifying an existing test mode to not loopback data to the test entity computing device in the uplink.

19. The non-transitory computer readable storage medium of claim 18, wherein the stored processor-executable software instructions are configured to cause the processor in the test entity computing device to perform operations such that modifying the existing test mode to not loopback data to the test entity computing device in the uplink by setting payload bits in the NAS signaling message.

20. The non-transitory computer readable storage medium of claim 15, wherein the stored processor-executable software instructions are configured to cause the processor in the test entity computing device to perform operations further comprising:
- setting DL MAX HARQ transmission=1 and RLC Max Retransmission=1.

21. The non-transitory computer readable storage medium of claim 15, wherein the stored processor-executable software instructions are configured to cause the processor in the test entity computing device to perform operations further comprising before a test begins:
- injecting a bad PDCP packet at predetermined interval;
- determining whether the user equipment device accurately reports those bad PDCP packets as missed packets in the PDCP status report; and
- using a result of determining whether the user equipment device accurately reports those bad PDCP packets as missed packets in the PDCP status report as a baseline for conducting the test.

22. A test entity computing device, comprising:
- means for sending to a user equipment device a non-access stratum (NAS) signaling message that requests at least one or more of:
  - activation of a new downlink-only test mode that does not loopback data to a test entity in an uplink; or
  - activation of a modified downlink-only test mode that does not loopback data to the test entity in the uplink;
- means for sending a first Packet Data Convergence Protocol (PDCP) status request to the user equipment device;
- means for sending downlink PDCP packets to the user equipment device during a measurement interval after sending the first PDCP status request to the user equipment device;
- means for receiving a physical layer (PHY) hybrid acknowledge request (HARQ) acknowledgement (ACK) or non-acknowledgement (NACK) from the user equipment device and determining expected missed layer 1 packets based on information included in the received PHY HARQ ACK/NACK;
- means for sending a second PDCP status request to the user equipment device after the measurement interval;
- means for receiving a PDCP status report from the user equipment device in response to the second PDCP status request; and
- means for determining missed layer 2 packets from a First Missing Count (FMC) value or bitmap included in the received PDCP status report.

23. A method performed by a processor in a test entity for layer 2 sustained downlink maximum data rate decoding performance of a user equipment device, comprising:
- modifying an existing test mode to not loopback data to the test entity in an uplink;
- sending to the user equipment device a non-access stratum (NAS) signaling message that requests activation the modified test mode;

sending a first Packet Data Convergence Protocol (PDCP) status request to the user equipment device;

sending downlink PDCP packets to the user equipment device during a measurement interval after sending the first PDCP status request to the user equipment device;

receiving a physical layer (PHY) hybrid acknowledge request (HARQ) acknowledgement (ACK) or non-acknowledgement (NACK) from the user equipment device and determining expected missed layer 1 packets based on information included in the received PHY HARQ ACK/NACK;

sending a second PDCP status request to the user equipment device after the measurement interval;

receiving a PDCP status report from the user equipment device in response to the second PDCP status request; and determining missed layer 2 packets from a First Missing Count (FMC) value or bitmap included in the received PDCP status report.

24. A test entity computing device, comprising:
a processor configured with processor-executable software instructions to:
  modify an existing test mode to not loopback data to the test entity in an uplink;
  send to a user equipment device a non-access stratum (NAS) signaling message that requests activation of the modified test mode;
  send a first Packet Data Convergence Protocol (PDCP) status request to the user equipment device;
  send downlink PDCP packets to the user equipment device during a measurement interval in response after the first PDCP status request to the user equipment device;
  receive a physical layer (PHY) hybrid acknowledge request (HARQ) acknowledgement (ACK) or non-acknowledgement (NACK) from the user equipment device and determine expected missed layer 1 packets based on information included in the received PHY HARQ ACK/NACK;
  send a second PDCP status request to the user equipment device after the measurement interval;
  receive a PDCP status report from the user equipment device in response to the second PDCP status request; and
  determining missed layer 2 packets from a First Missing Count (FMC) value or bitmap included in the received PDCP status report.

* * * * *